(12) United States Patent
Piazza et al.

(10) Patent No.: US 8,313,654 B2
(45) Date of Patent: Nov. 20, 2012

(54) METHODS FOR FLOCCULATING SUSPENSIONS USING BIOBASED RENEWABLE FLOCCULANTS

(75) Inventors: George Piazza, Meadowbrook, PA (US); Rafael Garcia, Wyncote, PA (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 322 days.

(21) Appl. No.: 12/859,530

(22) Filed: Aug. 19, 2010

(65) Prior Publication Data

US 2011/0042321 A1 Feb. 24, 2011

Related U.S. Application Data

(60) Provisional application No. 61/235,774, filed on Aug. 21, 2009, provisional application No. 61/238,369, filed on Aug. 31, 2009.

(51) Int. Cl.
*B01D 21/01* (2006.01)
*B03D 3/00* (2006.01)
*C02F 1/52* (2006.01)

(52) U.S. Cl. ......... 210/730; 210/724; 210/725; 210/729

(58) Field of Classification Search .................. 210/723, 210/724, 725, 729, 730
See application file for complete search history.

(56) References Cited

U.S. PATENT DOCUMENTS 4,966,713 A * 10/1990 Keys et al. .................... 210/705
6,132,625 A * 10/2000 Moffett ......................... 210/727

OTHER PUBLICATIONS

Piazza, G.J., et al., Meat & Bone Meal Extract and Gelatin as Renewable Flocculants, Annual Meeting and Expo of the American Oil Chemists' Society, 2008, p. 128.

* cited by examiner

*Primary Examiner* — Christopher Upton
*Assistant Examiner* — Nader Hossaini
(74) *Attorney, Agent, or Firm* — John D. Fado; G. Byron Stover

(57) ABSTRACT

Methods for aggregating suspended solid particles in an aqueous medium involving mixing the aqueous medium with an effective amount of a flocculant to aggregate the solid particles to form aggregated solid particles, and optionally separating the aggregated solid particles from the aqueous medium. The flocculant is obtained from animal blood. The pH of the aqueous medium may be adjusted to a pH of about 4.5 to about 5.7 by the addition of at least one acid or acidic buffer. The temperature of the aqueous medium may be adjusted to a temperature range of about 10° to about 50° C.

18 Claims, 13 Drawing Sheets

Fig. 6

METHODS FOR FLOCCULATING SUSPENSIONS USING BIOBASED RENEWABLE FLOCCULANTS

REFERENCE TO RELATED APPLICATION

This application claims the benefit of U.S. Provisional Application No. 61/235,774, filed 21 Aug. 2009, and U.S. Provisional Application No. 61/238,369, filed 31 Aug. 2009, both of which are incorporated herein by reference in their entirety.

BACKGROUND OF THE INVENTION

The present invention relates to methods for aggregating suspended solid particles in an aqueous medium involving mixing the aqueous medium with an effective amount of a flocculant obtained from animal blood to aggregate the suspended particles, making them easier to separate from the aqueous medium.

Approximately nine billion chickens, 114 million hogs, and 17 million cattle are slaughtered in the U.S. per year (Agriculture Statistics Board, 2009, National Agricultural Statistics Service, U. S. Department of Agriculture). Due to limited demand, income from selling chicken blood (CKB) is not sufficient to cover costs for capturing and processing the blood, and the blood is treated as waste. The CKB, diluted with processing water, is partially treated to remove solids before discharge into the environment. Blood from meat processors is transferred to renderers who prepare blood meal. However, rendering plants are closing due to the reduction of user demand, and rendering plants are now charging a disposal fee for blood (Mittal, G. S., Bioresource Technology, 97: 1119-1135 (2006)). It would be beneficial to chicken and red meat processors if an additional income stream could arise from development of processes that convert CKB, bovine blood (BB) and porcine blood (PB) to useful products. In addition, removal of blood for product preparation would reduce environmental pollution.

A flocculant is a substance that causes suspended particles to aggregate and form discrete flocs (Krishnan, S. V., and Y. A. Attia, Polymeric flocculants, In: Somasundaran, P., Moudgil, B. M. (Eds.), Vol. 27, Surfactant Science Series, Reagents in Mineral Technology, Marcel Dekker, Inc., New York, pp. 485-518 (1988)). Aggregation of the fine particles usually results in accelerated sedimentation to give a clarified solution. Many flocculants are polymeric, and they are used in a wide variety of processes such as wastewater clarification (Maximova, N., and O. Dahl, Curr. Opin. Colloid Int. Sci., 11: 246-266 (2006)), paper manufacture, concentration during chemical operations, and dewatering and thickening in mineral operations (Swarovsky, L., Solid-liquid separation, 4th edition, Butterworth-Heinemann, Oxford, p. 126). They are also used as filtration and centrifugation aids (Lewellyn, M. E., and P. V. Avotins, Dewatering/filtering aids, In: Somasundaran, P., Moudgil, B. M. (Eds.), Vol. 27, Surfactant Science Series, Reagents in Mineral Technology, Marcel Dekker, Inc., New York, pp. 559-578 (1988)).

The most widely used polymeric flocculant is anionic polyacrylamide (PAM) because of its high effectiveness and low toxicity to aquatic life (Nasser, M. S., and A. E. James, Effect of polyacrylamide polymers on floc size and rheological behaviour of kaolinite suspensions, Colloids and Surfaces A: Physicochem. Eng. Aspects, 301: 311-322 (2007)). PAM is also applied directly to soil to prevent erosion in agricultural and construction areas (Sojka, R. E., et al., Advances in Agronomy, 92: 75-162 (2007)).

PAM is manufactured from chemicals that are made from natural gas, so it is expected that the price of PAM will rise over time as supplies of natural gas are depleted. Thus, renewable, biodegradable replacements are being sought. Toward this goal, derivatives of amylopectin, carboxymethylcellulose, guar gum, starch, and glycogen have been tested as flocculants (Pal, S., et al., Colloids and Surfaces A: Physiochem. Eng. Aspects, 289: 193-199 (2006)). Derivatives of chitosan have been examined as coagulation/flocculation aids in wastewater treatment (Renault, F., et al., Eur. Polym. J., 45: 1337-1348 (2009)). Extracellular biopolymeric materials from microorganism fermentation have recently been investigated as a new source of renewable flocculants (Salehizadeh, H., and S. A. Shojaosadati, Biotech. Adv., 19: 371-385. (2001)). Additionally, suspensions of chitosan, starch xanthate, cellulose xanthate, and acid-hydrolyzed cellulose microfibrils have been tested for control of soil sediment runoff (Orts, W. J., et al., Industrial Crops and Products, 11: 19-29 (2000)). Known renewable flocculants and erosion control agents generally must be used at significantly higher concentrations than PAM to achieve equivalent results.

We have found that flocculants obtained from animal blood can be used as a biodegradable replacement for PAM.

SUMMARY OF THE INVENTION

In accordance with the present invention there is provided methods for aggregating suspended solid particles in an aqueous medium involving mixing the aqueous medium with an effective amount of a flocculant to aggregate the solid particles to form aggregated solid particles, and optionally separating the aggregated solid particles from the aqueous medium; wherein the flocculant is obtained from animal blood.

BRIEF DESCRIPTION OF THE DRAWINGS

Figure 6:
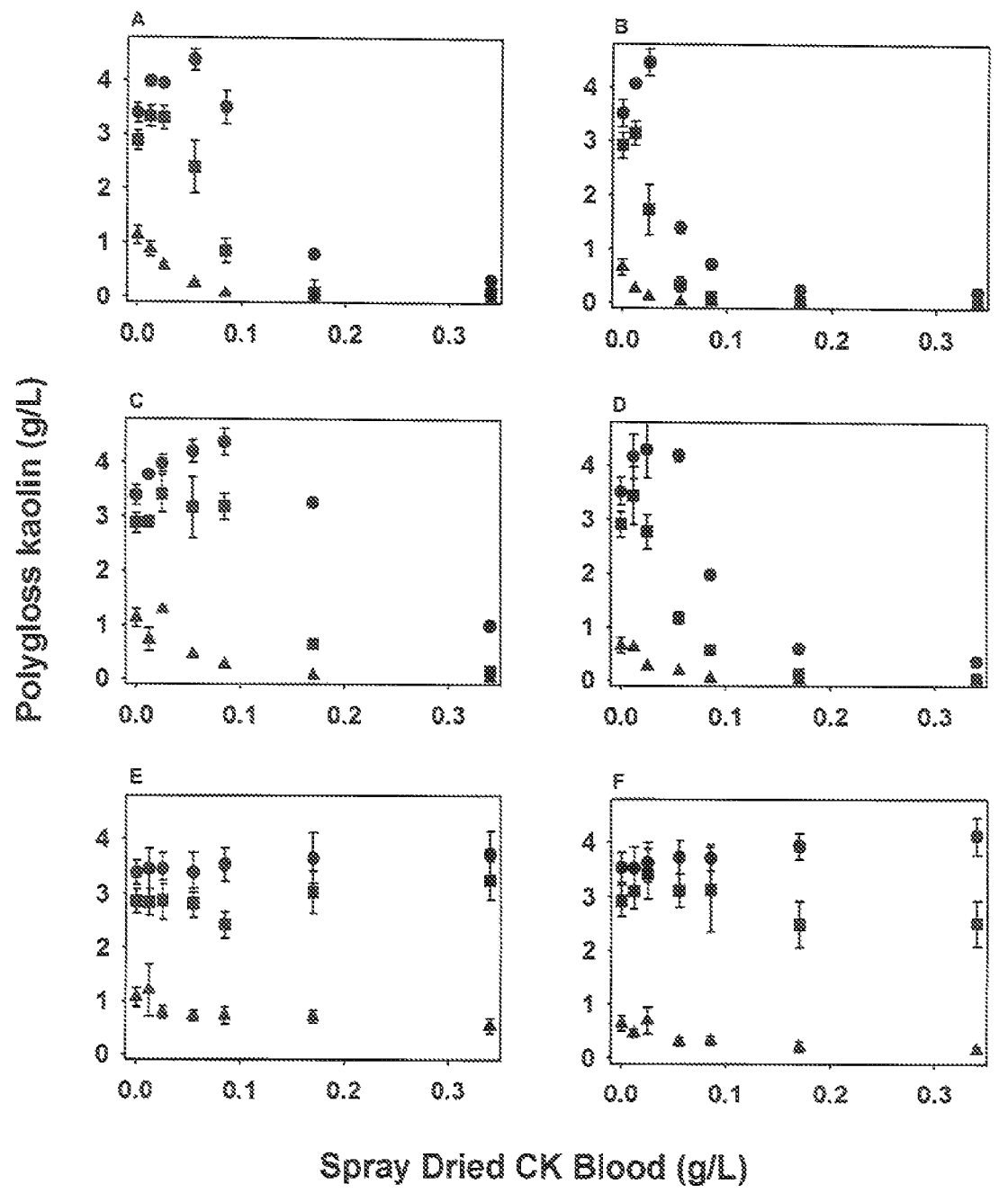

FIG. 6 shows influence of spray dried CKB fractions A-s, B-s, and C-s with 30 mM, pH 5.5 buffer and calcium chloride upon the amount of Polygloss® kaolin in suspension at various times as described below. Graphs A, C, and E contained no added calcium chloride; Graphs B, D, and F contained 0.2 calcium chloride. Graphs A and B: CKB fraction A-s; Graphs C and D: CKB fraction B-s; Graphs E and F: CK blood fraction C-s. The control containing no CKB fraction is shown on the left at the zero point. The data is from sampling at 1 h (●), 5 h (■), and 24 h (▲). Data are the mean ±SE of five trials.

DETAILED DESCRIPTION OF THE INVENTION

Figure 2:
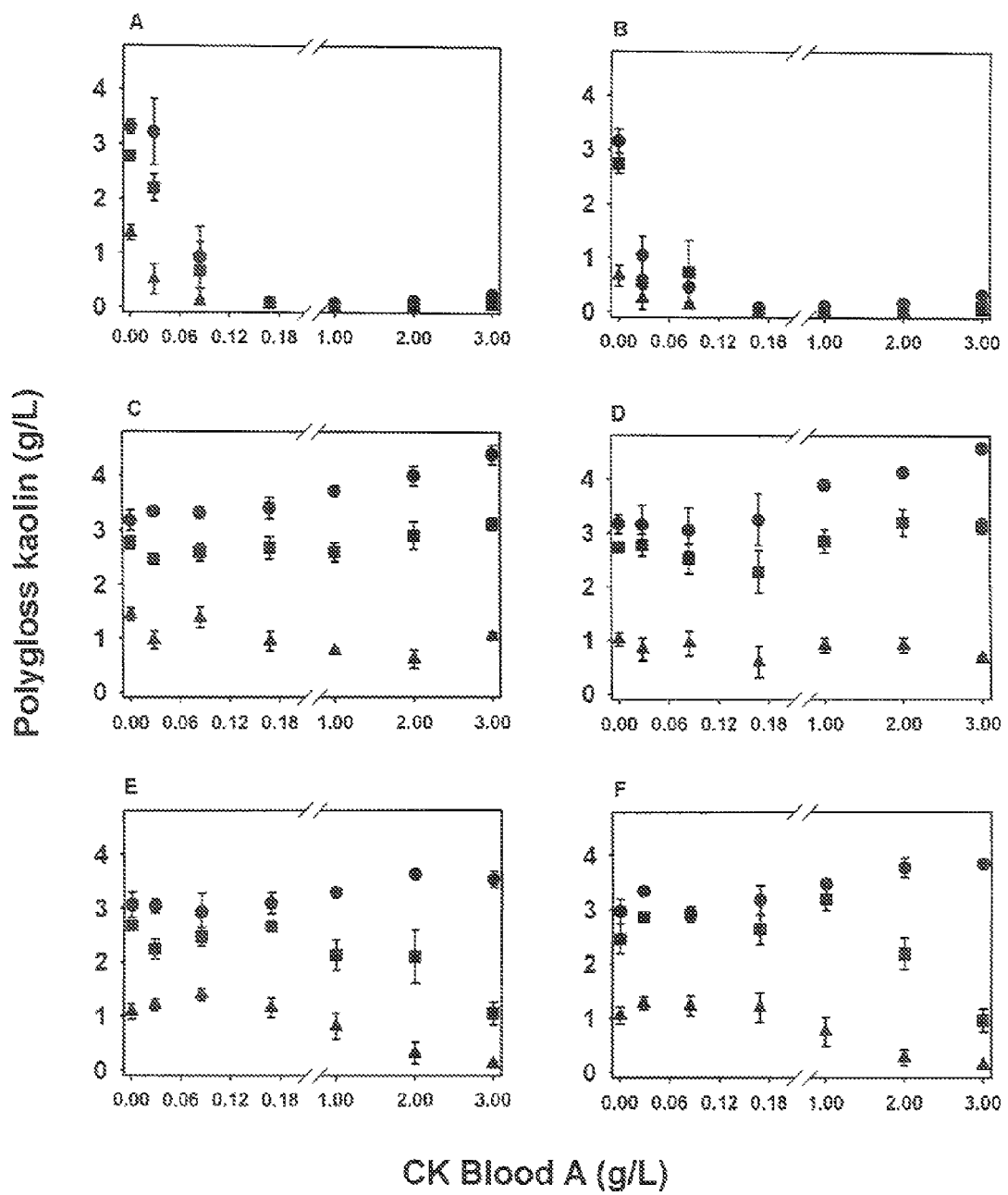
FIG. 2 shows influence of CKB fraction A, buffer pH, and calcium chloride upon the amount of Polygloss® kaolin in suspension at various times as described below. Graphs A, C, and E contained no added calcium chloride; Graphs B, D, and F contained 0.2 mM calcium chloride. Graphs A and B: pH 5.5 buffer; Graphs C and D: pH 7.0 buffer; Graphs E and F; pH 10.0 buffer. The buffer used for each pH value is given in the methods section. The control containing no CKB fraction is shown on the left at the zero point. The data is from sampling at 1 h (●), 5 h (■), and 24 h (▲). Data are the mean ±SE of five trials.
Figure 3:
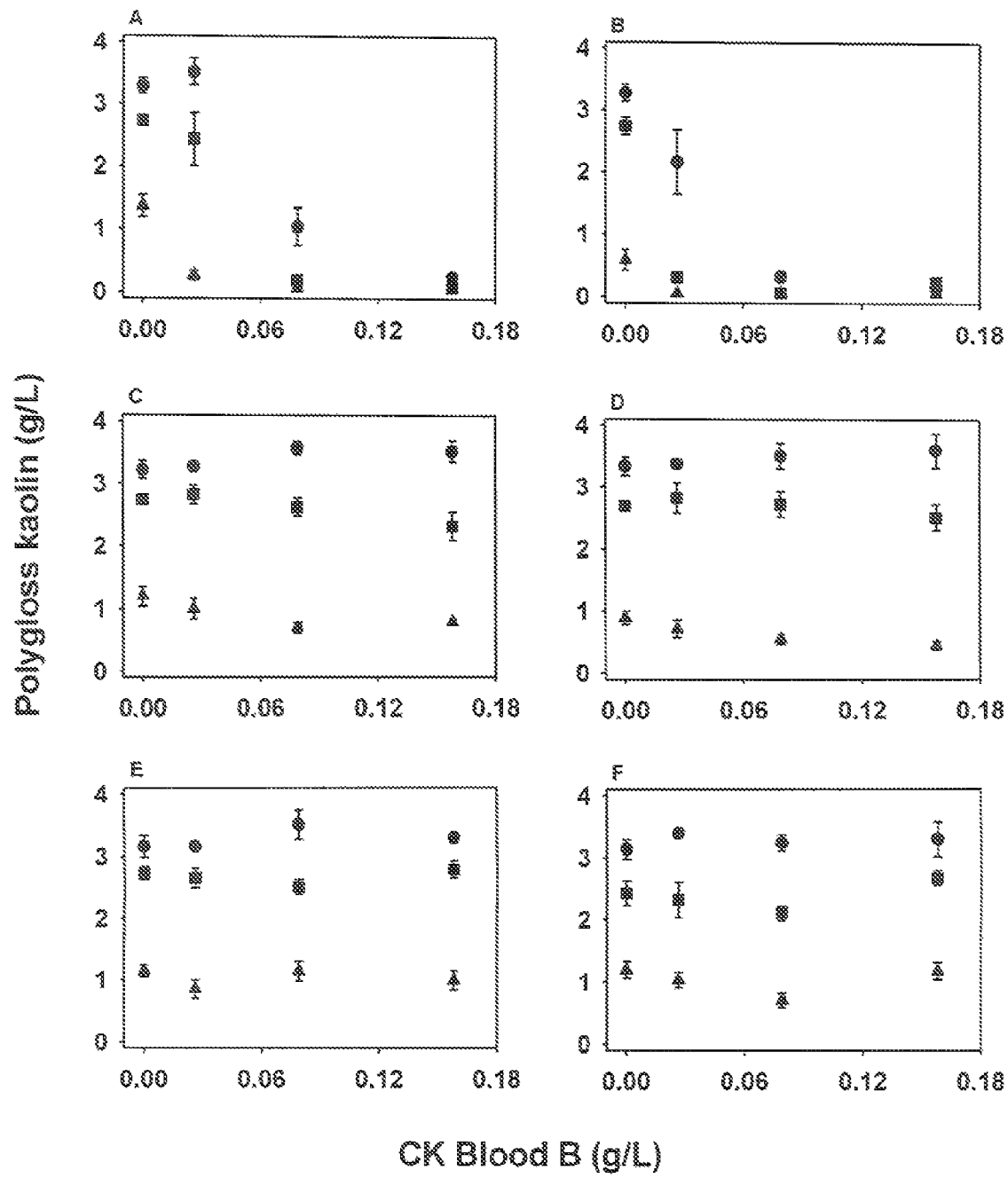
FIG. 3 show influence of CKB fraction B, buffer pH, and calcium chloride upon the amount of Polygloss® kaolin in suspension at various times as described below. Graphs A, C, and E contained no added calcium chloride; Graphs B, D, and F contained 0.2 mM calcium chloride. Graphs A and B: pH 5.5 buffer; Graphs C and D: pH 7.0 buffer; Graphs E and F; pH 10.0 buffer. The buffer used for each pH value is given in the methods section. The control containing no CKB fraction is shown on the left at the zero point. The data is from sampling at 1 h (●), 5 h (■), and 24 h (▲). Data are the mean ±SE of five trials.
Figure 4:
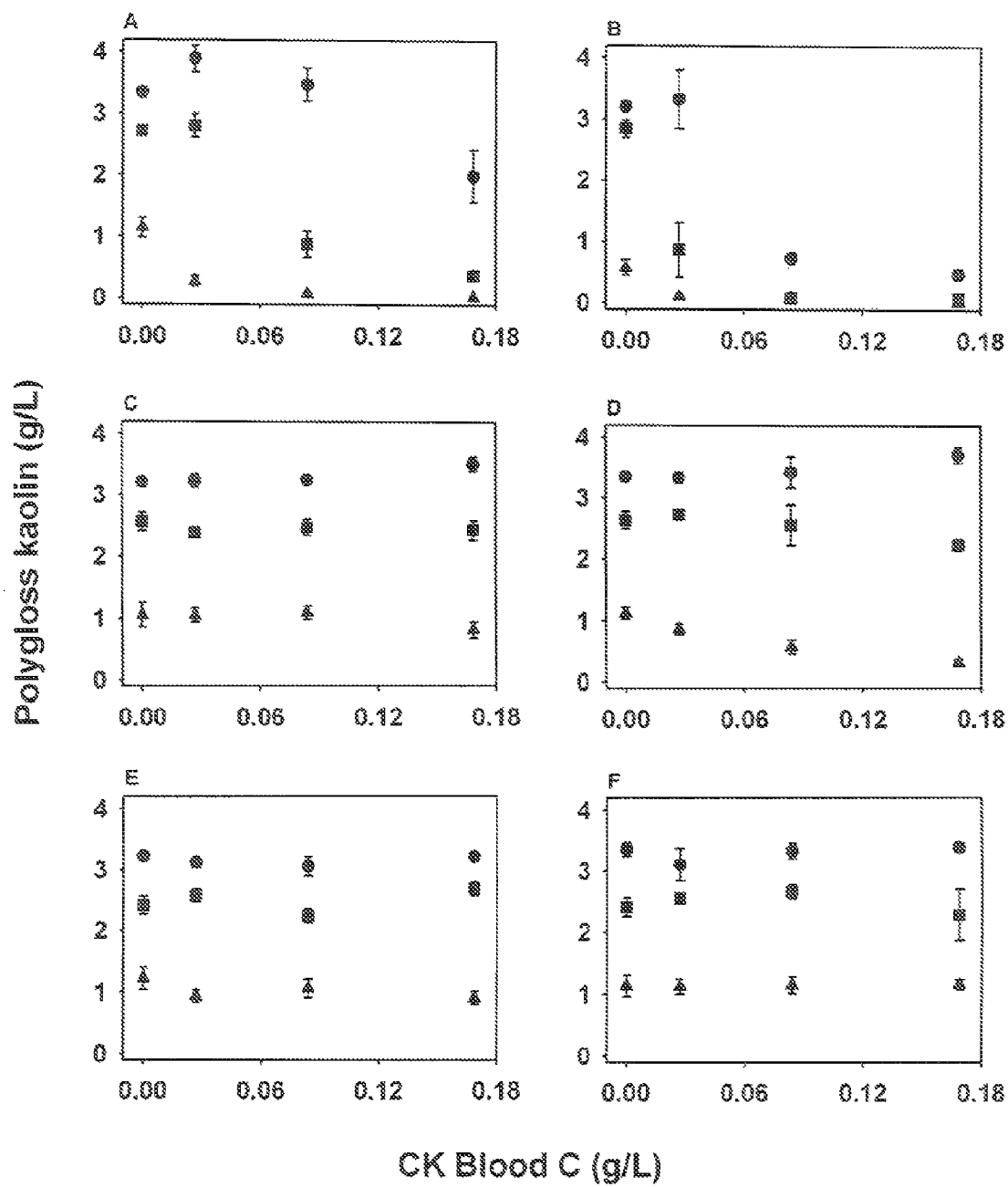
FIG. 4 shows influence of CKB fraction C, buffer pH, and calcium chloride upon the amount of Polygloss® kaolin in suspension at various times as described below. Graphs A, C, and E contained no added calcium chloride; Graphs B, D, and F contained 0.2 mM calcium chloride. Graphs A and B: pH 5.5 buffer; Graphs C and D: pH 7.0 buffer; Graphs E and F: pH 10.0 buffer. The buffer used for each pH value is given in the methods section. The control containing no CKB fraction is shown on the left at the zero point. The data is from sampling at 1 h (●), 5 h (■), and 24 h (▲). Data are the mean ±SE of five trials.
Figure 5:
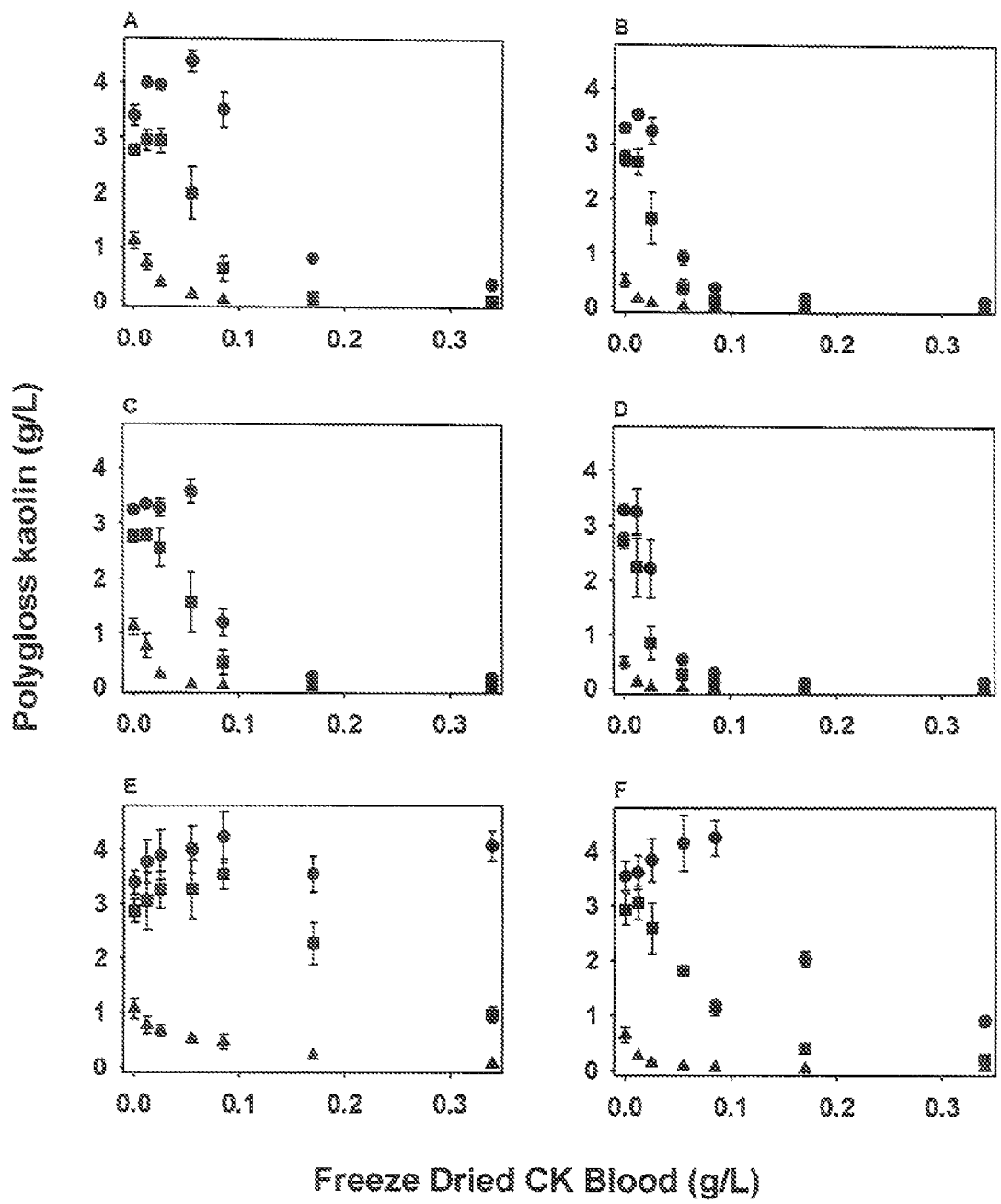
FIG. 5 shows influence of freeze dried CKB fractions A-f, B-f, and C-f with 30 mM, pH 5.5 buffer and calcium chloride upon the amount of Polygloss® kaolin in suspension at various times as described below. Graphs A, C, and E contained no added calcium chloride; Graphs B, D, and F contained 0.2 calcium chloride. Graphs A and B: CK blood fraction A-f; Graphs C and D: CKB fraction B-f; Graphs E and F: CK blood fraction C-f. The control containing no CKB fraction is shown on the left at the zero point. The data is from sampling at 1 h (●), 5 h (■), and 24 h (▲). Data are the mean ±SE of six trials.
Figure 7:
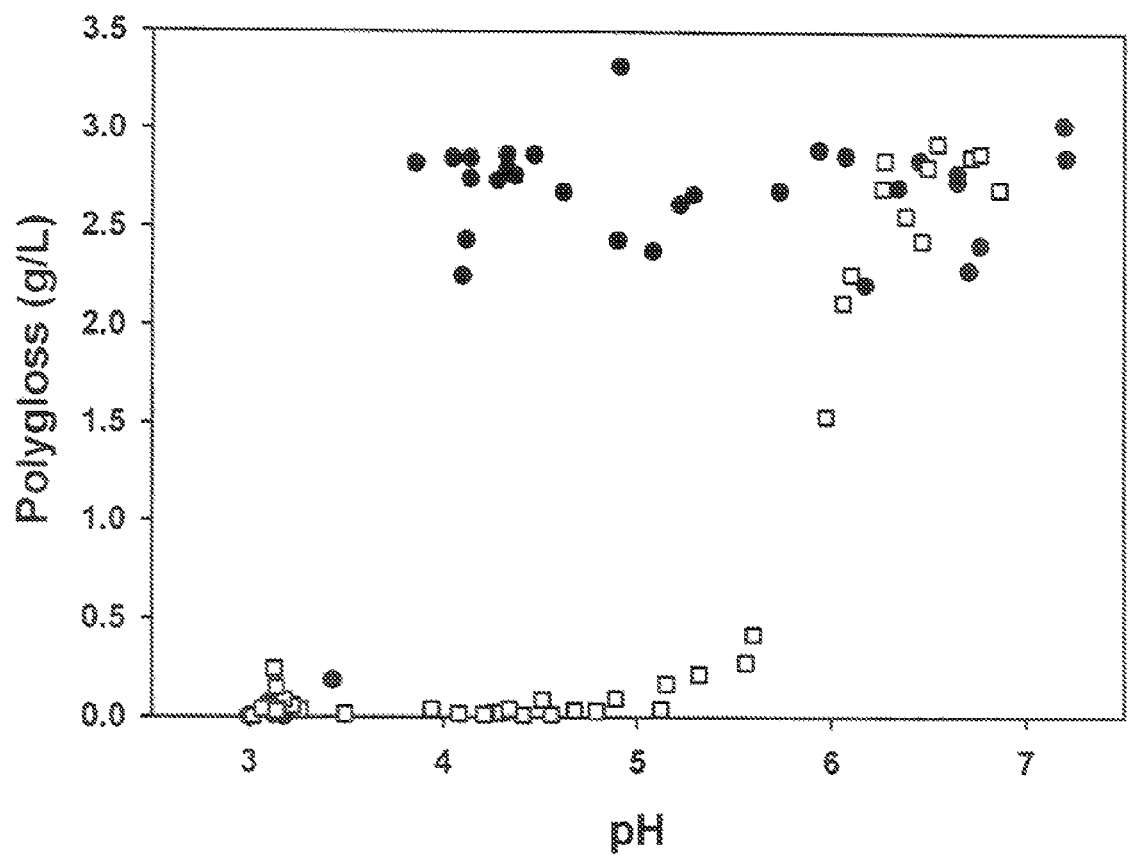
FIG. 7 shows the influence of citric acid-adjusted pH and CKB fraction A upon the amount of Polygloss® kaolin remaining in suspension 5 h after mixing as described below. Results of trials containing no CKB (●). Results of trials containing 0.843 mg (84.3 mg/L) CKB fraction A (□).
Figure 8:
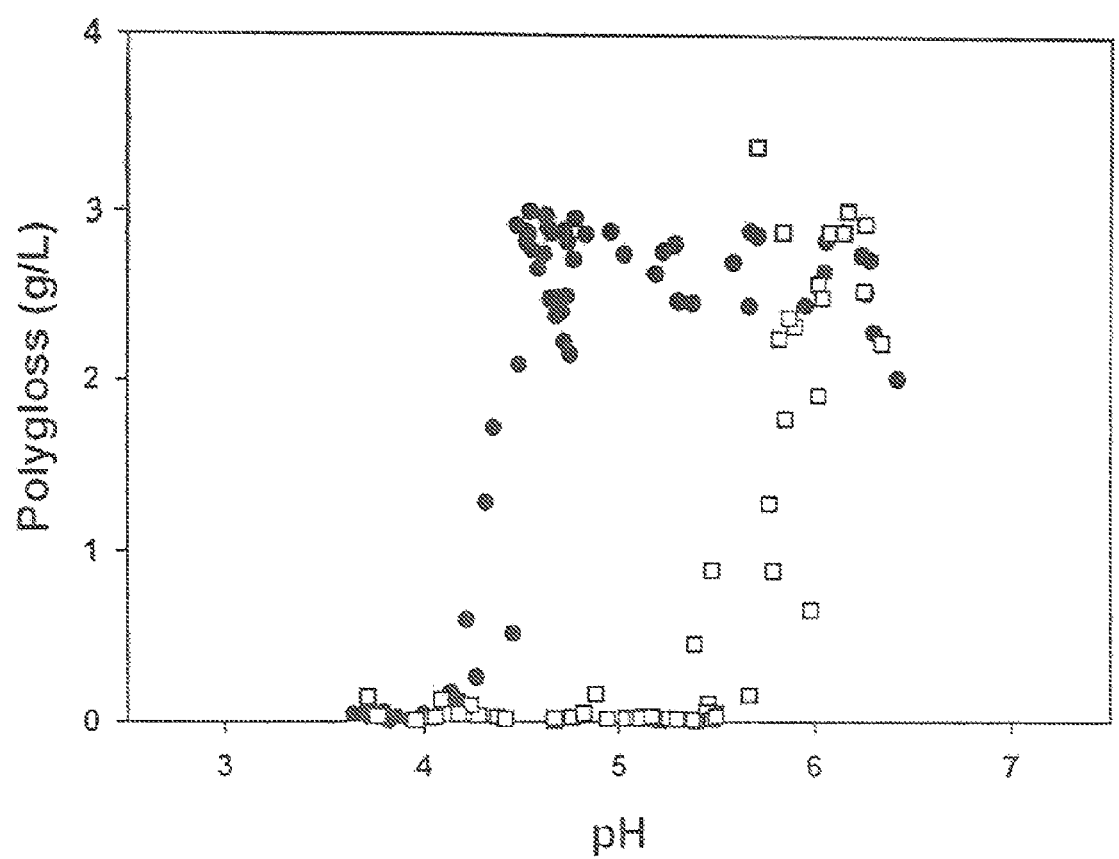
FIG. 8 shows the influence of phosphoric acid-adjusted pH and CKB fraction A upon the amount of Polygloss® kaolin remaining in suspension 5 h after mixing as described below. Results of trials containing no CKB (●). Results of trials containing 0.843 mg (84.3 mg/L) CKB fraction A (□).
Figure 9:
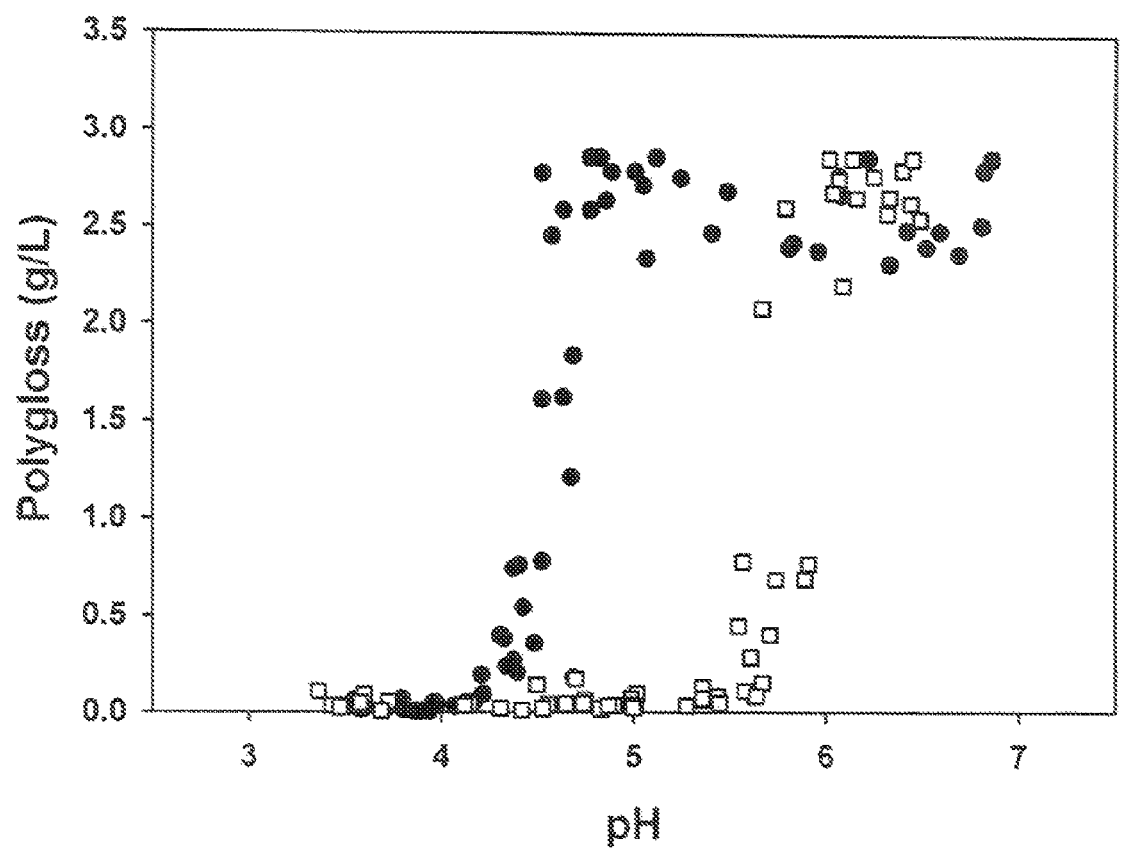
FIG. 9 shows the influence of sulfuric acid-adjusted pH and CKB fraction A upon the amount of Polygloss® kaolin remaining in suspension 5 h after mixing as described below. Results of trials containing no CKB (●). Results of trials containing 0.843 mg (84.3 mg/L) CKB fraction A (□).
Figure 10:
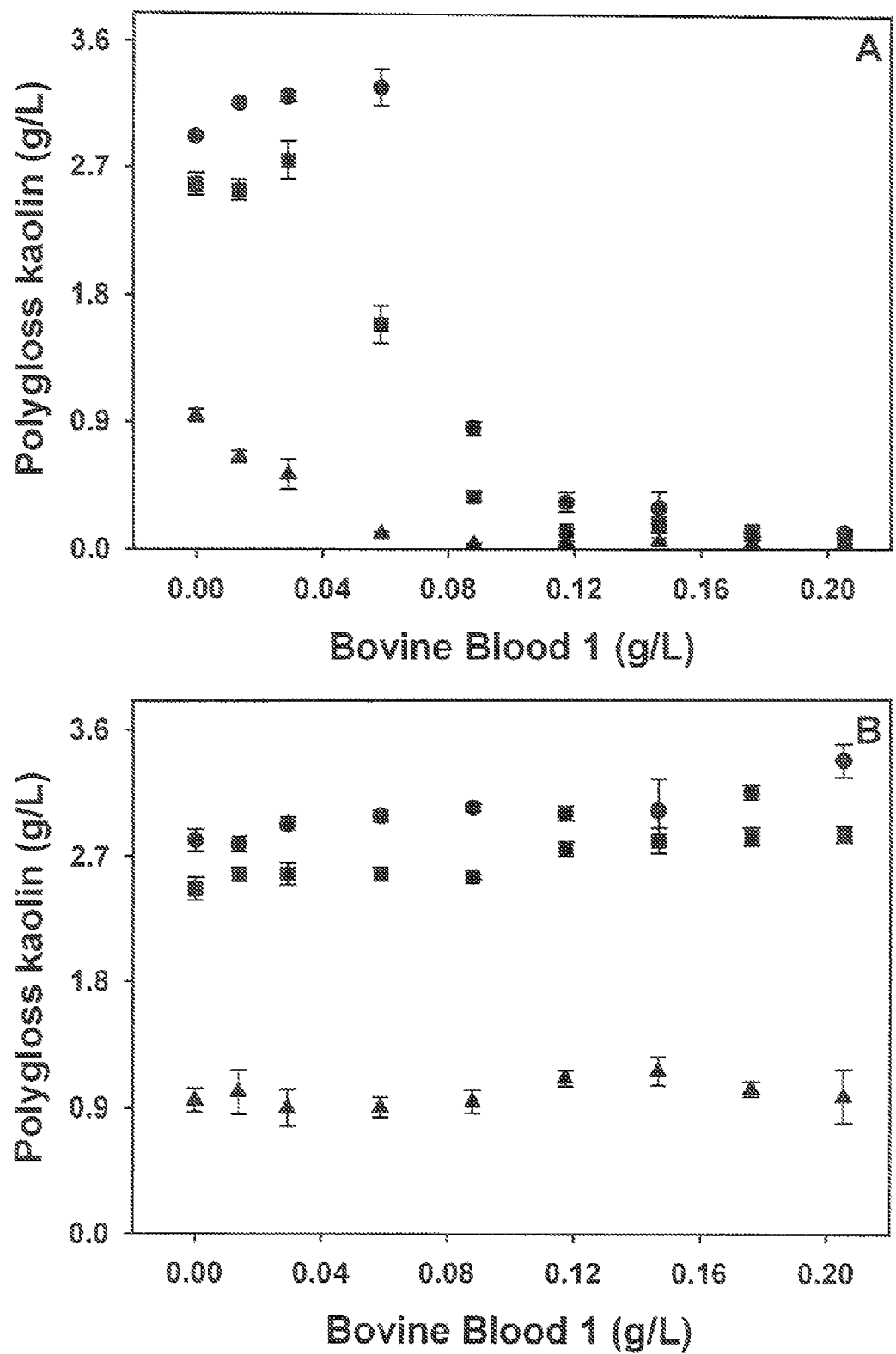
FIG. 10 shows influence of bovine blood (BB) fraction 1 upon the amount of Polygloss kaolin remaining in suspension at various times in the presence of 30 mM, pH 5.5 MES buffer (graph A) or with no buffer added (graph B). Fraction 1 contained Na citrate (sodium citrate) as the anticoagulant. Symbols represent data obtained at different settling times after mixing the kaolin suspension: 1 h (●), 5 h (■), and 24 h (▲). The control containing no BB fraction is shown on the left at the zero point. Data are the mean ±SE of five trials.
Figure 11:
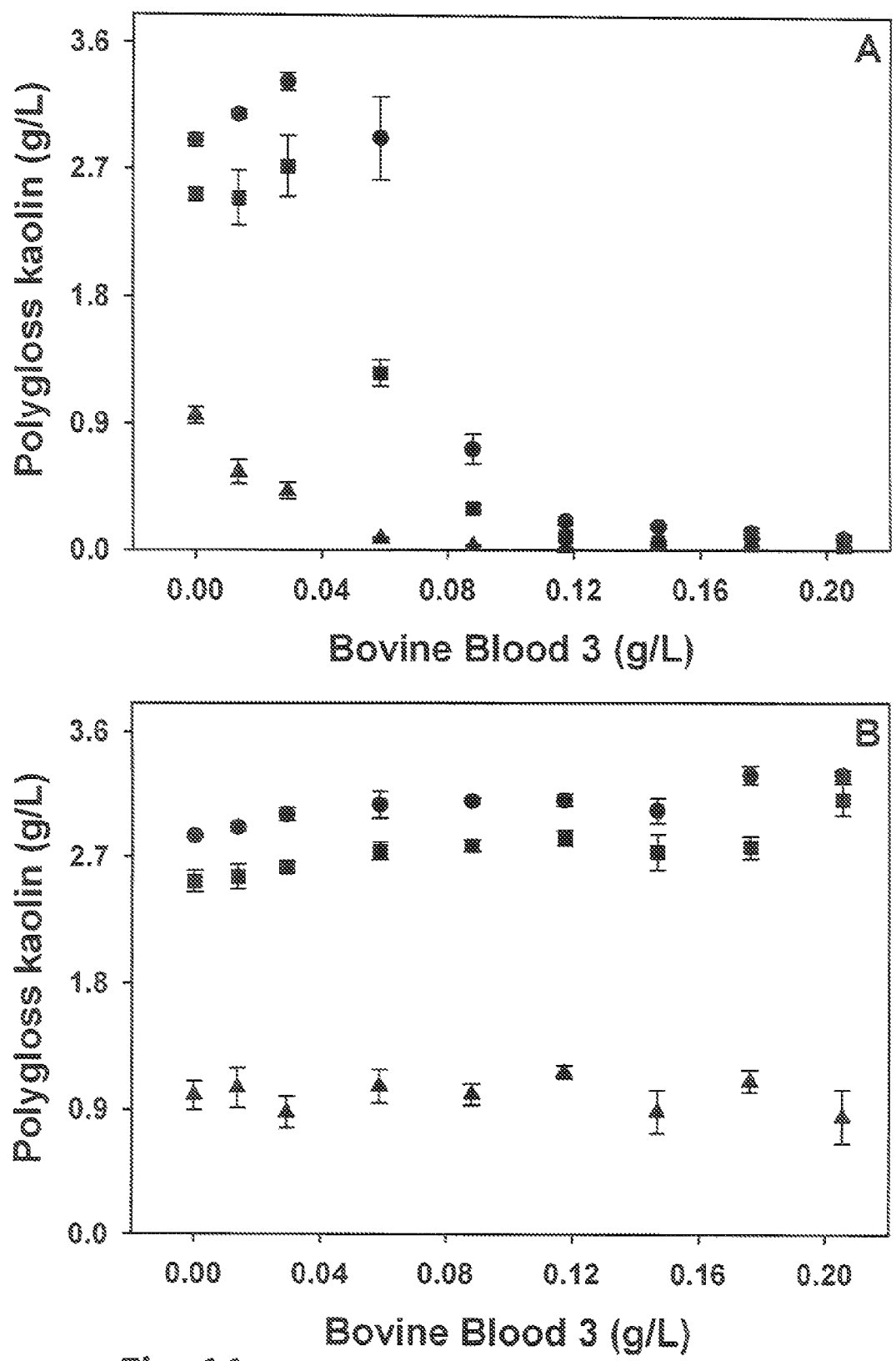
FIG. 11 shows influence of bovine blood (BB) fraction 3 upon the amount of Polygloss kaolin remaining in suspension at various times in the presence of 30 mM, pH 5.5 MES buffer (graph A) or with no buffer added (graph B). Fraction 3 contained $Na_2EDTA$ (disodium ethylenediaminetetraacetic acid) as the anticoagulant. Symbols represent data obtained at different settling times after mixing the kaolin suspension: 1 h (●), 5 h (■), and 24 h (▲). The control containing no BB fraction is shown on the left at the zero point. Data are the mean ±SE of five trials.
Figure 12:
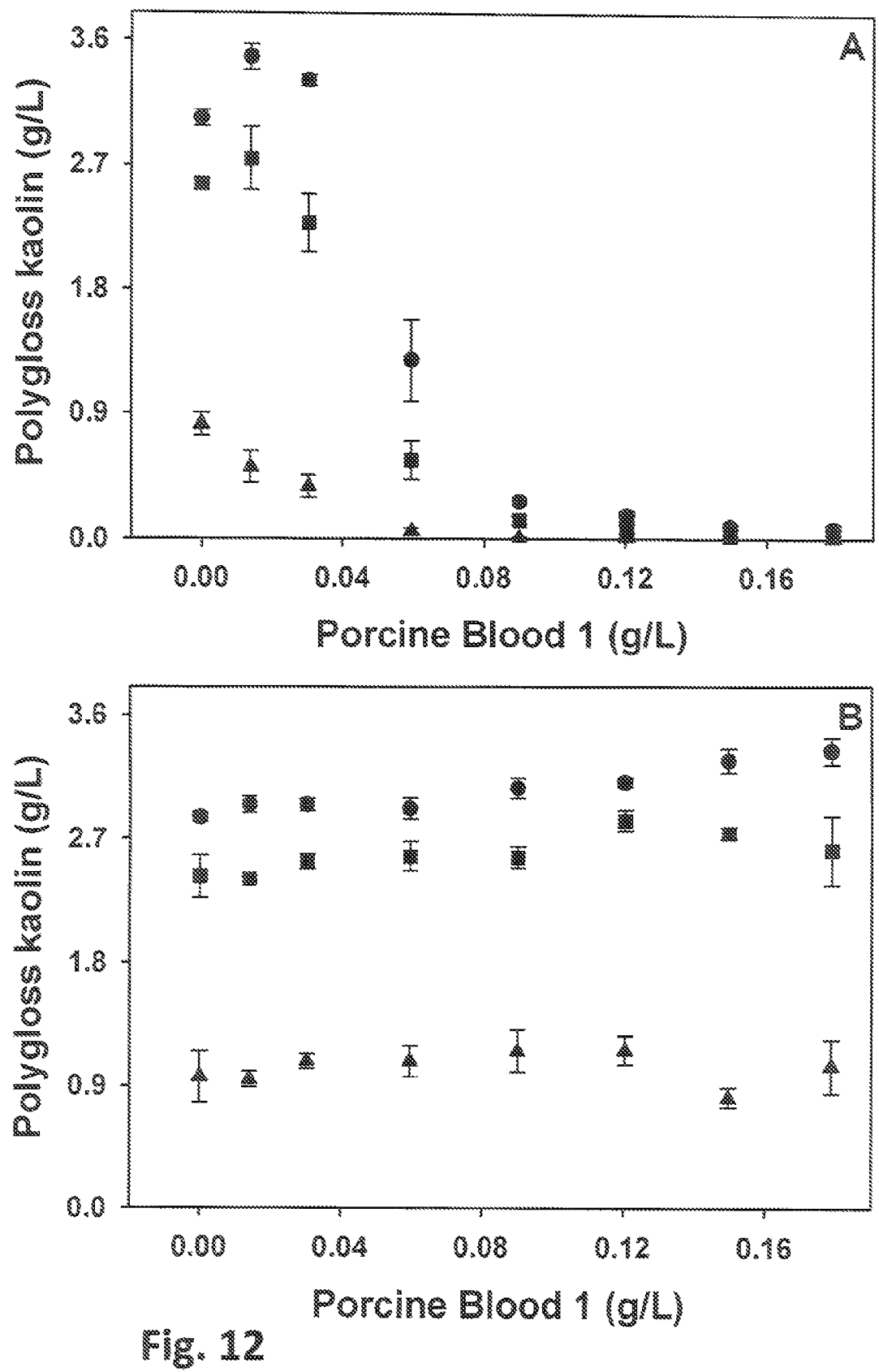
FIG. 12 shows influence of porcine blood (PB) fraction 1 upon the amount of Polygloss kaolin remaining in suspension at various times in the presence of 30 mM, pH 5.5 MES buffer (graph A) or with no buffer added (graph B). Fraction 1 contained Nacitrate as the anticoagulant. Symbols represent data obtained at different settling times after mixing the kaolin suspension: 1 h (●), 5 h (■), and 24 h (▲). The control containing no PB fraction is shown on the left at the zero point. Data are the mean ±SE of five trials.
Figure 13:
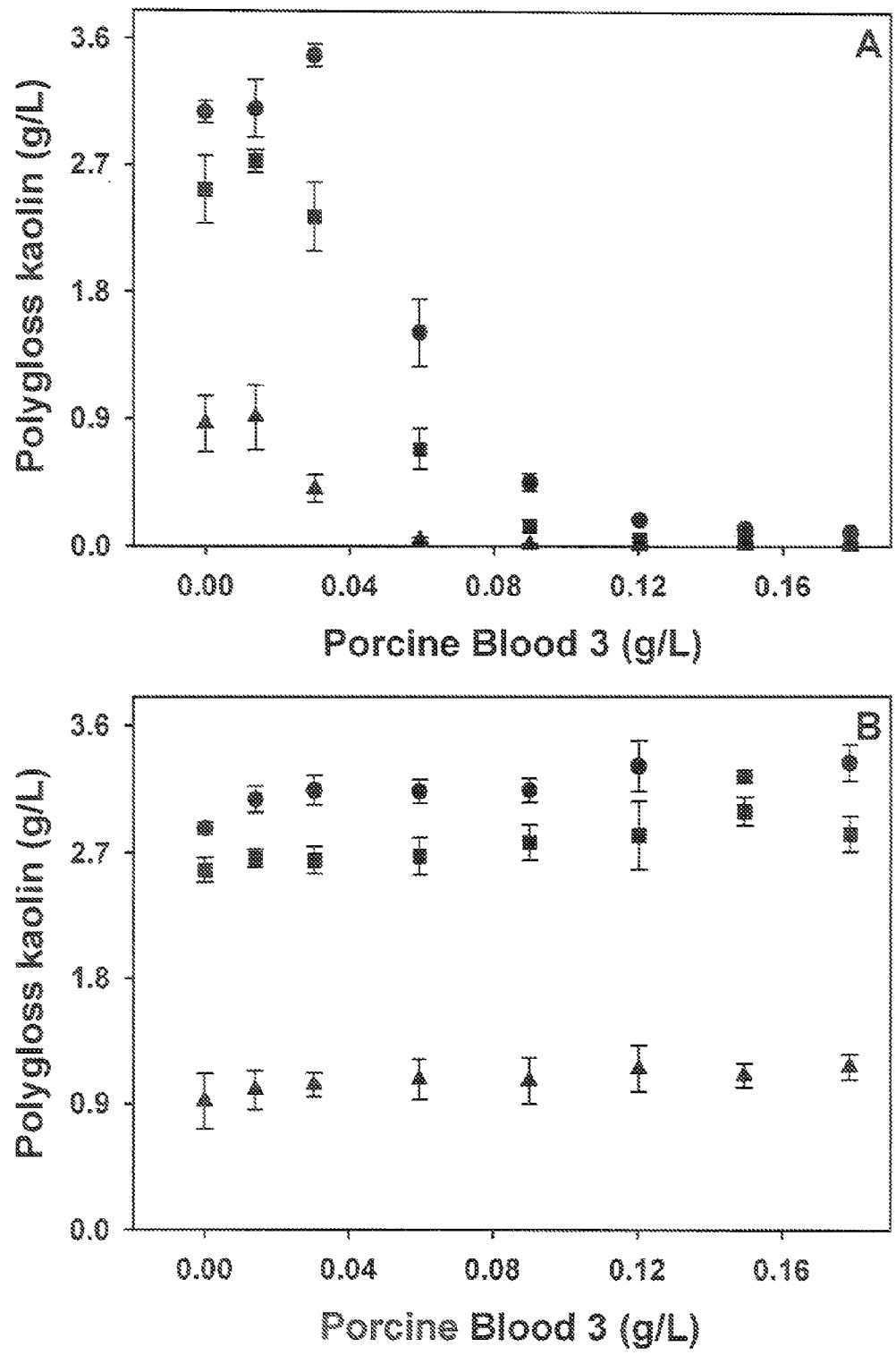
FIG. 13 shows influence of porcine blood (PB) fraction 3 upon the amount of Polygloss kaolin remaining in suspension at various times in the presence of 30 mM, pH 5.5 MES buffer (graph A) or with no buffer added (graph B). Fraction 3 contained $Na_2EDTA$ as the anticoagulant. Symbols represent data obtained at different settling times after mixing the kaolin suspension: 1 h (●), 5 h (■), and 24 h (▲). The control containing no PB fraction is shown on the left at the zero point. Data are the mean ±SE of five trials.

The present invention concerns methods for aggregating suspended solid particles (e.g., kaolin) in an aqueous medium involving mixing the aqueous medium with an effective amount of a flocculant (to aggregate the solid particles) to form aggregated solid particles, and optionally separating the aggregated solid particles from the aqueous medium. The flocculant is obtained from animal blood from agricultural livestock (e.g., poultry (including chickens), pigs, cattle), generally slaughtered agricultural livestock. The flocculant includes the following: whole animal blood; animal blood free of coagulated material (fraction A described below); plasma (fraction B, supernatant from centrifuged fraction A described below); animal blood free of coagulated material which has been subsequently heated to about 75° C., centrifuged, and the supernatant utilized (fraction C described below); and dehydrated forms of the above (dried fractions described below; the dehydrated forms can be obtained by any form of dehydration, preferably freeze drying or spray drying). The flocculant also includes the following: blood plasma (blood after removal of red blood cells), blood serum (liquid obtained after centrifugation of coagulated blood), and purified or partially purified protein fractions, particularly hemoglobin from red blood cells and γ-globulin from blood plasma or serum. In addition, mixtures of the above can be used. Chicken blood does not readily coagulate, and we were able to complete our experiments with blood fractions that contained no anticoagulant. On the other hand, beef blood and pig blood coagulate very rapidly, and to complete experiments with the whole blood anticoagulant(s) must be added. Blood or blood plasma or partially purified proteins fractions can contain anticoagulant and still be good flocculants. For the flocculant to be active, the aqueous medium should be below about pH 5.7 (e.g., below pH 5.7), preferably below about pH 5.5 (e.g., below pH 5.5). Natural untreated water is often pH 5.7 or below due to the presence of carbonic acid from dissolved carbon dioxide and other natural acids. In those cases where the pH criteria are not met, the pH may be lowered with acidic buffer (FIG. 2, Graphs A and B; FIG. 3, Graphs A and B; FIG. 4, Graphs A and B; FIG. 5; FIG. 6; FIG. 10, Graph A; FIG. 11, Graph A; FIG. 12, Graph A; FIG. 13, Graph A). The pH may also be lowered by the addition of acid (FIGS. 7, 8, and 9). Optionally any of the flocculants described herein can be applied directly to soil as a means of binding the soil particles to prevent wind and water erosion.

The invention provides flocculants obtained from animal blood that exhibit good flocculating performance in comparison to known flocculants like PAM.

Examples of suspended solid particles or materials include particles containing silica (e.g., clays such as kaolin), sludge from a secondary wastewater treatment facility, or microorganisms such as algae cells. The suspended solid particles may be negatively charged particles such as silica and cellulose fibers which have a negative charge (Tatsumi, D., et al., Colloids and Surfaces A: Physicochemical and Engineering Aspects, 316: 151-158 (2008)).

The flocculants of the present invention should be added to an aqueous medium containing suspended solids, for which flocculation is desired, in an amount effective for that purpose. The flocculants may be used in a wide variety of processes such as wastewater clarification, paper manufacture, concentration during chemical operations, and dewatering and thickening in mineral operations. The flocculants used in the method is an effective amount (i.e., makes possible aggregation of the suspended solid materials) which will range from about 5 to about 500 mg/L (i.e., 5-500 mg/L), preferably about 20 to about 100 mg/L (i.e., 20-100 mg/L).

In the present method, the pH value of the aqueous medium containing suspended solids is adjusted by adding, as needed, an acid (e.g., sulfuric acid, phosphoric acid, citric acid) or acidic buffer to the aqueous media, so that the pH value of the aqueous media is about 4 to about 5.7. (e.g., 4-5.7). Although a flocculant from animal blood is added to flocculate particles suspended in the aqueous medium, the flocculant cannot exhibit a good effect of flocculating the suspended particles if the pH value of the aqueous medium is not less than about 5.7 (e.g., not less than 5.7). The flocculant obtained from animal blood can exhibit a better effect of flocculating the suspended particles if the pH value of the aqueous medium falls in the range of from about 4.8 to about 5.5 (e.g., 4.8-5.5).

In addition, in the present method, either before or after the addition of the flocculant from animal blood, the temperature of the aqueous medium is adjusted to a temperature range of about 10° to about 50° C. (e.g., 10°-50° C., preferably about 20° to about 25° C. (e.g., 20°-25° C.)). If the temperature of the aqueous medium is higher than about 75° C. (>75° C.), then the flocculant cannot satisfactorily flocculate the suspended particles.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

Example 1

Materials: A fine kaolin with the trade name Polygloss®90 from Huber Engineered Materials was a gift from the M. F. Cachat Company (Lakewood, Ohio). Polygloss®90 had a surface area of 22.0 $m^2/g$. Zwitterionic buffers, MES (2-(morpholino)ethanesulfonic acid), HEPES (N-(2-hydroxyethyl)piperazine-N'-(ethanesulfonic acid)), and CAPS (3-(cyclohexylamino)-1-propanesulfonic acid) were obtained from Sigma-Aldrich (St. Louis, Mo.). Anionic PAM from Cytec with trade name Superfloc® A-110 Flocculant was a gift from Kemira (New Milford, Conn.). Water was purified to a resistance of 18 megohm-cm using a Barnstead E-pure system. CKB was collected directly from decapitated birds at Tyson Foods in New Holland, Pa.

Preparation of CKB fractions: CKB was stored at 4° C. for 36 h. Three CKB fractions were prepared. The first fraction which is termed "blood fraction A" is whole CKB, decanted to exclude the portion that had coagulated during storage. The second fraction which is termed "blood fraction B" is CKB plasma which is the supernatant fraction from centrifugation of fraction A (whole blood) at 5,200 g (2×10 min). The third fraction termed "blood fraction C" is the supernatant from centrifugation of heated blood fraction A. Blood fraction A was heated on a hot plate with stirring at about 1° C. per minute. When the temperature of the blood reached 75° C. coagulation took place, and the blood was immediately removed from the hot plate. The blood was centrifuged at 5,200 g (2×30 min). CKB fractions A, B, and C were stored at −20° C. until flocculation testing.

Freeze dried CKB fractions: CKB fraction A, B, and C were dehydrated by freeze drying. Blood fractions were divided into 120 mL aliquots, placed into 600 mL round bottom flasks, and frozen in dry ice/acetone. The frozen fractions were placed onto a vacuum line (150 mTorr) equipped with a dry ice/acetone trap until all water was removed (approximately 18 h). The freeze dried CKB fractions are termed A-f, B-f, and C-f. These freeze dried fractions were stored at −20° C. until diluted with water for flocculation testing.

Spray dried CKB fractions: CKB fraction A, B, and C were dehydrated using a Büchi (Flawil, Switzerland) B-191 Mini Spray Drier. Chilled water (<5° C.) was circulated through the annular cavity in the spray nozzle to prevent premature coagulation. Operating conditions were adjusted to maintain the air exiting the drying chamber at 95°-105° C. The spray dried CKB fractions are termed A-s, B-s, and C-s. These were stored at 22° C. in a desiccator over drierite.

flocculation testing: The flocculation performance (FP) of the CKB fractions was determined by observing their ability to accelerate the sedimentation of finely divided clay (kaolin). All assays were performed in 15 mL conical, glass centrifuge tubes with plastic snap caps. In a typical experiment 47.3 mg Polygloss® kaolin was added to a tube containing the indicated concentration of the previously frozen CKB fractions or aqueous solutions of the freeze dried or spray dried fractions (20-800 mg/L) in a total volume of 10 mL. All experiments were replicated with or without the addition of 0.2 mM calcium chloride. The contents of the capped tubes were mixed by inverting the tubes several times. Thereafter the tubes were placed in a tube rack, and the tubes were left undisturbed while the contents settled at 22° C. At the indicated time, a 0.1 or 0.2 mL aliquot was removed after placing the tip of a P200 Gilson Pipetman 22 mm below the surface (50 µL mark on the pipette tip). The aliquot was diluted to 1.0 mL, and the absorption of this kaolin suspension at 600 nm was measured. If the absorption was greater than 1.5 absorption units, the sample was further diluted with deionized water. All absorption measurements were corrected for dilution and for absorption by the blood fraction containing no kaolin. Absorption was converted to kaolin in suspension (g/L) with the aid of calibration curves prepared with a range of kaolin suspensions. These calibration curves showed that there was a linear relationship between absorption at 600 nm and the mass fraction of suspended kaolin.

Some experiments contained pH buffers. Buffer solutions were prepared using the zwitterionic buffers MES, HEPES, or CAPS, and the pH values of these solutions were adjusted to pH 5.5, 7.0, or 10.0, respectively, with sodium hydroxide. Sedimentation experiments were prepared as described above except the concentration of the buffer was 30 mM in each assay tube.

Preparation of frozen CKB fractions and preliminary flocculation testing: Fresh CK blood was collected from a local processing plant. Whole CKB, freed of coagulated blood, and two fractions, blood plasma and heated blood, were prepared as described in the methods section. These are termed blood fractions A, B, and C. The CKB fractions were stored frozen until flocculation testing could be conducted.

Figure 1:
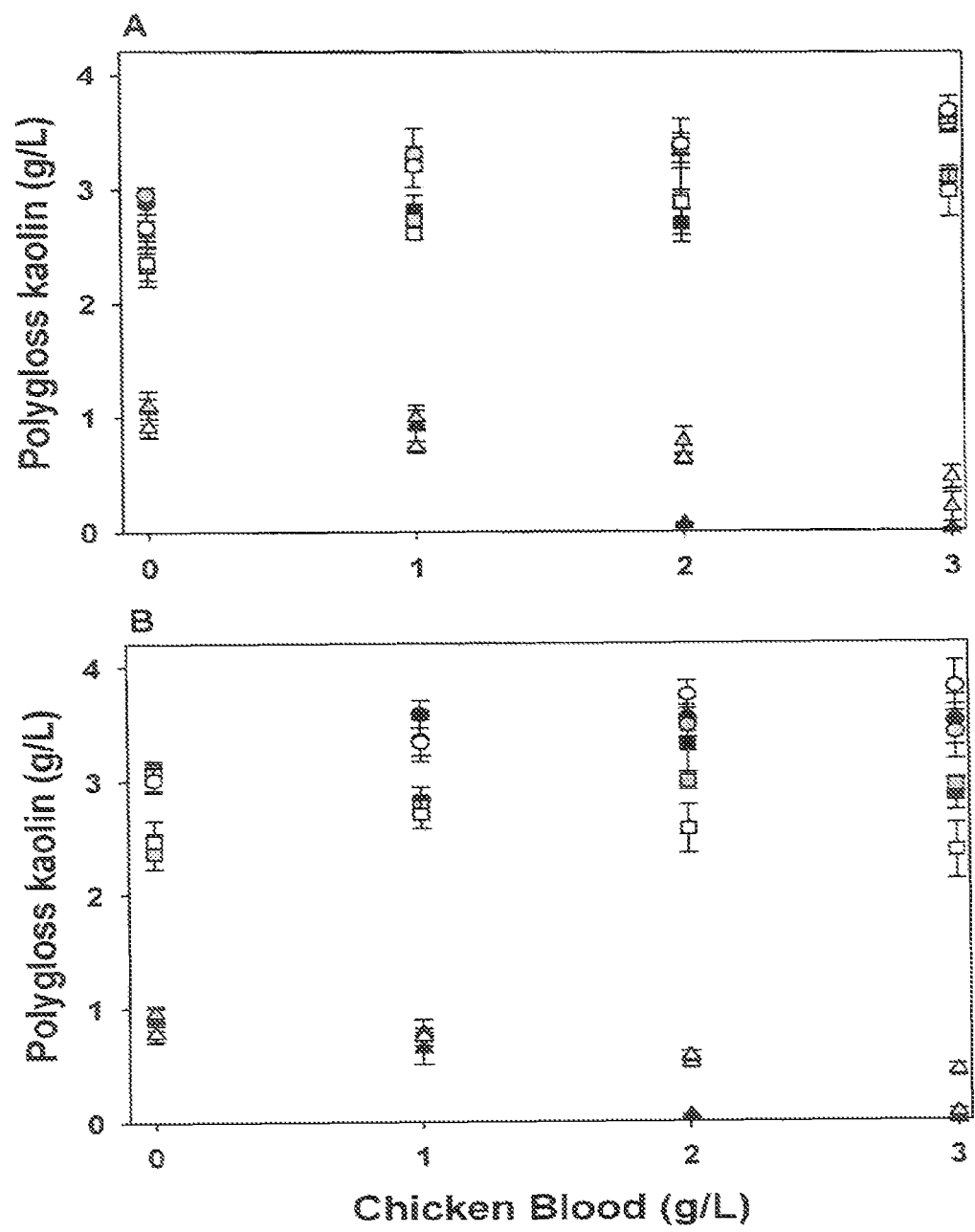
FIG. 1 shows influence of chicken blood (CKB) fractions A, B, and C (all fractions previously frozen; fractions A, B, and C are described in detail below) upon the amount of Polygloss® kaolin remaining in suspension at various times in the absence (graph A) or presence of 0.2 mM calcium chloride (graph B). Buffer was not added to the assays. Blood fraction A: 1 h (●), 5 h (■), and 24 h (▲); Blood fraction B: 1 h (◉), 5 h (▣), and 24 h (⊛); Blood fraction C: 1 h (□), 5 h (▢), and 24 h (△). The control containing no CKB fraction is shown on the left at the zero point. Data are the mean ±SE of five trials.

Flocculation testing was conducted according to a procedure in which the rate of settling of finely divided clay (kaolin) particles was measured. These clay particles contain silicates, and therefore their surfaces are predominately negatively charged. The efficacy of this procedure was shown by testing with a widely used commercial polymeric flocculant, anionic polyacrylamide. Different amounts of CKB fractions A, B, and C were tested for their flocculation activity, alone and with 0.2 mM calcium chloride. Calcium chloride acts as a bridging ion, and its addition is necessary for the flocculating activity of anionic PAM. The results of testing are shown in FIGS. 1. At 1 h and 5 h time points none of the fractions reduced the suspended kaolin particles compared to the control values. At 24 h, there was a surprisingly significant reduction of kaolin particles compared to the control values; however, very high concentrations of blood fractions were used, and calcium chloride had only a small effect on the test results. Fraction A was the most effective fraction, reducing the kaolin concentration in suspension to less than 1% of control values. Fraction B was the next most effective, removing 18% and 7% of the suspended kaolin without and with the addition of calcium chloride, respectively. Fraction C was the least effective fraction, removing 51% and 56% of the suspended kaolin without and with the addition of calcium chloride. Experiments with freeze dried fractions and spray dried fractions were also performed at concentrations up to 45 g/L. These fractions showed the ability to reduce the kaolin concentration compared to control values only at 24 h, and high concentrations of the fractions were required for action (data not shown).

Influence of buffer addition on flocculation by CKB fractions A, B, and C: The pH of CKB fractions A, B, and C had values between 7.8 and 8.5. The influence of pH upon flocculation by the three CKB fractions was investigated in a systematic fashion.

Zwitterionic buffers at a concentration of 30 mM were added to the flocculation tests. The buffers used were MES, HEPES, and CAPS, and their pH values were adjusted to pH 5.5, 7.0, 10.0, respectively. The results of tests with the three buffers mixed with different amounts of blood fractions A, B, and C are shown in FIGS. 2, 3, and 4, respectively. Each figure contains six graphs. The upper two graphs (graphs A and B) show experimental results from trials using pH 5.5 buffer. The middle set of graphs (C and D) show results from trials using pH 7.0 buffer, and the lower set of graphs (graphs E and F) show results from trials using pH 10.0 buffer. The graphs on the right (graphs B, D, and F) show the results of trials that contained 0.2 mM calcium chloride; the graphs on the left (graphs A, C, and E) show those that contained no calcium chloride. Although the results displayed in each graph are different, the overall trend was that the trials performed with pH 5.5 buffer surprisingly showed strong flocculating behavior at relatively low levels of CK blood fractions A, B, and C, whereas the trials performed at pH 7.0 and pH 10.0 surprisingly showed either no flocculating behavior or weak flocculating behavior.

For a quantitative discussion of the results at pH 5.5, the concentration of flocculant required to reduce the kaolin level at or below 1 g/L within experimental error in 1 h and 5 h for CKB fractions A, B, and C is shown in FIGS. 2-4. Without the addition of calcium chloride (see graph A in FIGS. 2-4), a reduction of kaolin at or below 1 g/L in 1 h required 0.084 g/L of blood fractions A or B, but no tested level of blood fraction C could reduce the kaolin level below 1 g/L in 1 h. At 5 h, 0.084, 0.084, and 0.079 g/L of CKB fractions A, B, and C, respectively, were needed to reduce kaolin at or below 1 g/L. With the addition of calcium chloride (see graph B in FIGS. 2-4), the reduction of kaolin at or below 1 g/L in 1 h required 0.028, 0.084, and 0.079 g/L of blood fractions A, B, and C, respectively. In 5 h, 0.028, 0.027, and 0.026 g/L of CKB fractions A, B, and C, respectively, were needed to reduce kaolin at or below 1 g/L.

Freeze dried CKB fractions A-f, B-f, and C-f with pH 5.5 buffer: As noted above, frozen CKB samples A, B, and C effectively promoted flocculation only when pH 5.5 buffer was added to the tests. Therefore subsequent test with their freeze dried counterparts, A-f, B-f, and C-f, were conducted only with the addition of pH 5.5 buffer. The freeze dried samples were dissolved in water prior to use. The results of trials with these fractions are shown in the six graphs displayed in FIG. 5. The graphs on the right (graphs B, D, and F) show the results of trials that contained 0.2 mM calcium chloride; the graphs on the left (graphs A, C, E) show those that contained no calcium chloride. The graphs for A-f are located at the top (graphs A and B); graphs for B-f are shown in the middle (graphs C and D); graphs for C-f are shown at the bottom (graphs E and F). The concentration of flocculant required to reduce the kaolin level at or below 1 g/L within experimental error in 1 h and 5 h will be noted. Without the addition of calcium chloride, 0.17 and 0.085 g/L of CKB fractions A-f and B-f, respectively, were required for sedimentation in 1 h. No tested concentration of CKB fraction C-f was able to satisfy the sedimentation criteria. At 5 h with no calcium chloride added, 0.085, 0.055, and 0.34 g/L of blood fractions A-f, B-f, and C-f, respectively, were needed for flocculation to or below 1 g/L kaolin. With the addition of calcium chloride, 0.055, 0.055 and 0.34 g/L of samples A-f, B-f, and C-f, respectively, were needed to reduce kaolin at or below 1 g/L. At 5 h with calcium chloride added, the needed concentrations of blood fractions A-f, B-f, and C-f were slightly reduced to 0.055, 0.025, and 0.085 g/L, respectively for sedimentation of kaolin to 1 g/L or below.

Spray dried CKB fraction A-s, B-s, and C-s with pH 5.5 buffer: The frozen CKB samples A, B, and C were spray dried according to the procedure outlined above. The spray dried samples were designated as A-s, B-s, and C-s. These were reconstituted in water before testing them as flocculants. The results of trials with these fractions are shown on the six graphs displayed in FIG. 6. The graphs on the right (graphs B, D, and F) show the results of trials that contained 0.2 mM calcium chloride; the graphs on the left (graphs A, C, E) show those that contained no calcium chloride. The graphs for A-s are located at the top (graphs A and B); graphs for B-s are shown in the middle (graphs C and D); graphs for C-s are shown at the bottom (graphs E and F). To reduce the kaolin level at or below 1 g/L in 1 h and 5 h required at minimum the following concentrations of CKB fractions. A-s and B-s, respectively: 1 h, no calcium chloride, 0.17 and 0.34 g/L; 1 h, with calcium chloride, 0.085 and 0.17 g/L; 5 h, no calcium chloride, 0.085 and 0.17 g/L; 5 h, with calcium chloride, 0.055 and 0.085 g/L. No tested concentration of CKB fraction C-s was able to reduce the level of kaolin to or below 1 g/L in 1 h or 5 h.

Summary and Conclusions: In summary, frozen, freeze dried, and spray dried CKB fractions were poor flocculants when testing was performed in water or with pH 7.0 or pH 10.0 buffer. However, when flocculation was conducted in the presence of pH 5.5 buffer, the CKB fractions surprisingly became extremely effective flocculants. The results obtained with the various CKB fractions mixed with pH 5.5 buffer are summarized in Table 1. Also shown in this table are results obtained with PAM and porcine gelatin, a relatively effective purified protein.

With frozen CKB fractions A, B, and C, the best results were surprisingly obtained with fractions A and B. CKB fraction C was prepared from heated blood, and the heating procedure had a deleterious effect upon the FP of this fraction as evinced by the inability of this fraction to lower the suspended concentration of kaolin to at least to 1 g/L in 1 h without the addition of calcium chloride.

The FP of freeze dried samples, A-f, B-f, and C-f, was varied when compared to that obtained with the frozen samples. CKB fraction B-f surprisingly performed as well or slightly better than fraction B. In contrast, a higher concentration of freeze dried CKB sample A-f was required than fraction A except at 5 h. with no added calcium chloride. Freeze dried sample C-f was the worst performer of the freeze dried fractions, and compared to fraction C, higher concentrations of this sample were needed for flocculation.

Overall the spray dried samples, A-s, B-s, and C-s, performed the worst, compared to the frozen and freeze dried samples. Nevertheless, at 5 h, without added calcium chloride, the same concentration of spray dried A-s was surprisingly required as frozen blood sample A. When calcium chloride was added, surprisingly less than twice the amount of A-s was required to lower kaolin to at least 1 g/L in 5 h. CKB fraction B-s performed worse than A-s, and the FP of fraction C-s was extremely poor. Fraction C-s had been heated twice, once during the preparation of the fraction, and once again during the spray drying process. Therefore the relatively poor result obtained with fraction C-s compared to C-f demonstrates that additional heat damage or denaturation of the blood protein occurred during the spray drying process. In spite of the problems associated with the FP of the spray dried samples, the results overall surprisingly were extremely good. This can be seen best by comparing FP obtained with the commercial flocculant PAM with that obtained with CKB fractions A, B, A-f, and B-f. The blood fractions were surprisingly able to act effectively within a 1 h period whereas in this time period PAM was not as effective. Without being bound by theory, the slower flocculation activity of PAM was probably related to the high viscosity of its solutions which slows sedimentation of the clay flocs. PAM cannot work without the addition of a calcium salt, but at 5 h in the presence of calcium chloride, results obtained with PAM can be directly compared to results obtained with the CKB fractions in the presence of pH 5.5 buffer. Surprisingly it can be seen from Table 1 that PAM and CKB samples A, B, C and B-f effectively acted at nearly the same concentrations while about twice the concentration of A-f was needed for action equivalent to that of PAM. As with CKB fractions, the FP of porcine gelatin was improved with the addition of pH 5.5 buffer. It can be seen from Table 1 that without the addition of calcium chloride, porcine gelatin and CKB fractions A, B, and B-f surprisingly acted at approximately the same concentration. At 5 h with the addition of calcium chloride, the concentrations of CKB fractions A, B, and C needed for effective flocculation were surprisingly lower than the effective porcine gelatin concentration, a testament to the effectiveness of CKB as a proteinaceous flocculant.

Example 2

FIGS. 7, 8 and 9 show the results of 5 h experimental trials of flocculation in which kaolin suspensions at various pH values were prepared using citric, phosphoric, or sulfuric acids, respectively. Those trials that contained only aqueous suspensions of Polygloss® kaolin with acid are shown by the closed circles. Those trials that contained Polygloss® kaolin, acid, and CKB fraction A are shown by the open squares. The figures show the amount of suspended kaolin versus the pH of the aqueous medium. The flocculation experiment were conducted for a total of 24 h after which pH values were obtained by inserting a pH probe directly into the flocculation tubes. Samples were withdrawn for measurement after 1, 5, and 24 h. Only the 5 h sample results are shown because the results at 1 and 24 h were similar.

Discussion: Water from natural sources is often acidic due to the presence of dissolved minerals and carbon dioxide (carbonic acid). Whether the water is acidic enough to allow flocculation by fractions prepared from CKB would need to be determined on a case by case basis. In those cases where the water contains insufficient acidity, FIGS. 2-6 showed that the addition of a pH 5.5 buffer provided sufficient acidity for flocculation activity by CKB fractions. However, buffer tends to be an expensive component and more economical acids could be used in the present invention to increase water acidity to promote complete sedimentation. The data shown in FIGS. 7, 8, and 9 provide supporting experimental evidence for the efficacy of relatively low cost acids. FIG. 7 shows sedimentation results from the addition of citric acid, a weak acid. FIGS. 8 and 9 show sedimentation results from the addition of phosphoric and sulfuric acids, two strong acids. When CKB fraction A was added (open squares), complete sedimentation of Polygloss® kaolin was observed in 5 h at pH 5.2 with citric acid and at pH 5.5 with phosphoric and sulfuric acids. Without the addition of CKB fraction A (closed circles), more acid must be added to completely neutralize the negative charges on the surface of the kaolin particles to induce their flocculation and subsequent sedimentation. An increase in acidity to pH 3.2 was necessary with citric acid and to pH 4.1 with phosphoric and sulfuric acids to give complete sedimentation in 5 h. Although the changes in pH required for complete sedimentation with and without the addition of CKB fraction A seem relatively small, it is important to remember that pH is a logarithmic measurement. By definition pH is equal to $-\log [H^+]$ where $[H^+]$ is the hydrogen ion concentration. Therefore, it is possible to calculate the hydrogen ion concentration which is needed for complete sedimentation in 5 h with and without the addition of CKB fraction A. These calculations showed that when using citric acid, the required hydrogen ion concentration was surprisingly nearly 100-fold lower for complete sedimentation in 5 h when CKB fraction A was added. When using phosphoric or sulfuric acids, the required hydrogen ion concentration was surprisingly about 25-fold lower for complete sedimentation in 5 h when CKB fraction A was added.

Thus, it may be concluded that clay flocculation can be promoted at relatively low levels of added acid when CKB fractions are added. After flocculation, the resulting aqueous supernatant can be discharged directly into the environment without causing environmental harm. In some instances, discharge of the supernatant containing CKB fractions may have beneficial effects. For example, if the discharged water is used for crop irrigation, the CKB provides a source of nitrogen and other minerals to the crops, reducing the need for the application of expensive fertilizer.

Example 3

Materials: Hemoglobin (2×crystallized and lyophilized), bovine serum albumin (BSA), Cohen fraction III (γ+β BB globulins), Cohen fraction IV-4 (α+β BB globulins), and γ BB globulin (EC 232-706-1) were purchased from Sigma-Aldrich (St. Louis, Mo.). Disodium ethylenediaminetetraacetic acid, dehydrate ($Na_2EDTA$) was from Aldrich (Milwaukee, Wis.). Sodium citrate (Nacitrate), dehydrate was from Baker Analyzed Reagents, (Phillips, N.J.), and citric acid, monohydrate was from Mallinckrodt (Paris, Ky.). Tricine buffer [N-(2-Hydroxy-1,1-bis(hydroxymethyl)ethyl)glycine], and ethylenediaminetetracetic acid (EDTA), 99% were obtained from Sigma-Aldrich (St. Louis, Mo.).

Preparation of bovine blood and porcine blood fractions: Fresh bovine blood (BB) and porcine blood (PB) were obtained at local abattoirs. After collection, the BB and PB was poured into 1 L plastic bottles containing measured amounts of anticoagulant, and the contents were mixed by inverting the closed bottles several times. The BB and PB fractions 1, 2, 3, and 4 contained, respectively, the following anticoagulants: 17.1 mM sodium citrate (Nacitrate); 17.1 mM Nacitrate with 7.6 mM citric acid; 10.8 mM disodium ethylenediaminetetraacetic acid ($Na_2EDTA$); and 10.8 mM $Na_2EDTA$ with 1.7 mM EDTA. A portion of the BB and PB was collected without anticoagulant, and the subsequently coagulated blood was used for the preparation of BB serum and PB serum. The BB and PB fractions were placed on ice. After their return to the laboratory, a portion of each BB and PB fraction was immediately centrifuged at 1,000 g for 20 min. The supernatant was carefully aspirated to remove BB plasmas 1, 2, 3, and 4 and PB plasmas 1, 2, 3, and 4. Triplicate samples (1 ml) of all of the fractions were placed in glass vials which were subsequently taken to dryness under a stream of nitrogen and then dried to constant weight in a vacuum oven at 45° C. to obtain sample dry weight values. After recording the pH of each BB and PB sample, plasma, and serum, the fractions were frozen at −20° C. until testing was begun.

Gel filtration chromatography: Gel filtration chromatography was conducted on a Waters 2695 Separation Module under isocratic conditions. Prior to injection, all samples were passed through 17 mm PVDF syringe filters (pore size: 0.45 micrometer) (SUN SRi, Rockwood, Tenn.). A BioSep-SEC-S3000 (300×7.80 mm, 5 micron) gel filtration column connected to a guard column with the same packing material (35×7.8 mm, 5 micron) (Phenomenex, Torrance, Calif.) was used as the chromatography media after conditioning in the eluting buffer. Each chromatography run was for 40 min. The eluting buffer was 50 mM ammonium hydrogen carbonate (pH 8.2). The flow rate was 0.5 mL/min.

The gel filtration HPLC column was calibrated using the following commercial standards: bradykinin acetate (molecular weight (MW) 1060 Da) was from Sigma (St. Louis, Mo.); aprotinin, cytochrome C, carbonic anydrase, and albumin were from a kit from Sigma for MW 6,500-66,000 Da for gel filtration chromatography; myoglobin, ovalbumin, gamma globulin, and thyroglobulin (MW range 17,000-670,000 Da) were components of a gel filtration standard from Bio-Rad Labs (Richmond, Calif.).

Preparative SDS polyacrylamide gel electrophoresis: Polyacrylamide gel electrophoresis (PAGE) was conducted in a MiniPROTEAN Tetra Cell system with a Power Pac Basic equipped with 10-20% precast Tris-Tricine/peptide gel (10 well, 30 μL), 8.6×6.8 cm (W×L) and 10×premixed running buffer, containing 100 mM Tris, 100 mM Tricine, 0.1% SDS, pH 8.3 following dilution to 1× with water (Bio-Rad, Hercules, Calif.). Samples were prepared by 50-90% dilution in Laemmli sample buffer containing 62.5 mM Tris-HCl, 25% glycerol, 2% SDS and 0.01% bromophenol blue (Bio-Rad, Hercules, Calif.), with 50 μL β-mercaptoethanol per 950 μL sample buffer. Samples (10-15 μL, 0.03-0.25 mg/mL) were added to the wells, and molecular weight markers (10 μL) were added to adjacent lanes. The markers were from a commercial preparation of eight proteins of MW 6.5 to 200 kDa (Bio-Rad, Hercules, Calif.). The gels were processed at 150 volts in running buffer for 30-60 min until the bromophenol blue tracking dye reached the bottom of the gel. The gels were stained with Simply Blue Safe Stain (Invitrogen, Carlsbad, Calif.) for 45-60 min. and destained with water for several hours.

Gel band digestion and protein identification with MALDI-TOF/TOF: Selected gel bands from preparative electrophorsis were excised, destained, reduced with DTT and alkylated with 2-iodocatemide. Trypsin and ProteasMAX surfactant (Promega, Madison, Wis.) were used to digest the gel bands according to the manufacturer's procedures. The resulting tryptic peptides were cleaned and concentrated on C18 ZipTip pipette tips (Millipore, Brillerica, Mass.) according to the manufacturer's procedure. Peptides were eluted from the C18 tip with 10 μl of a solution of α-cyano-4-hydroxy-cinnamic acid, 5 mg ml$^{-1}$, and spotted (1 μl) onto a stainless steel plates for mass spectrometry analysis. The resulting spotted plate was analyzed with a 4700 Proteomics Analyzer with matrix-assisted laser desorption/ionization with automated tandem time of flight fragmentation of selected ions mass spectrometer (MALDI-TOF/TOF, Applied Biosystems, Framingham, Mass.) in the positive reflection mode. Spectra were obtained by averaging 1000 or 2000 acquired spectra in the mass spectrometric (MS) or MS/MS mode, respectively. Conversion of TOF to mass (Da) for the monoisotopic ions, $[M+H]^+$, was based on calibration of the instrument with a peptide standard calibration kit (Applied Biosystems). MS and MS/MS results for the sample were combined and queried against the primary sequence from the SwissProt database using the Mascot (Matrix Science, Inc. Boston, Mass.) search engine through GPS Explorer Software (Applied Biosystems). Search criteria included 50 ppm and 0.1 Da error in the MS and MS/MS mode, allowance for one missed trypsin cleavage and oxidation of methionine and iodoacetamide alkylation of cysteine as a variable modifications. Reported proteins are above the threshold score of 54, corresponding to a 95% confidence for protein identification.

Discussion of Results. Flocculant activity of whole blood, plasma, and serum: FIGS. 10-13 show the results of trials with BB fractions 1, BB fraction 3, PB fraction 1, and PB fraction 3, respectively. In each figure, the top panel (A) shows results with pH 5.5 MES buffer, and the bottom panel (B) shows results without MES buffer. Fraction 1 of BB and PB contained Na citrate as the anticoagulant. The pH of these fractions was 7.5 without the addition of MES buffer. Fraction 3 of BB and PB contained $Na_2EDTA$. The pH of these fractions was 7.1 without the addition of MES buffer. From the results shown in FIGS. 10-13, it can be concluded that the blood fractions were effective flocculants when pH 5.5 MES buffer is present, but showed no flocculant activity when pH 5.5 MES buffer was absent. The results obtained with the BB fractions 1-4 and PB fractions 1 and 3 are summarized in Table 2. The required concentration of flocculants to give suspended Polygloss kaolin at or below 1 g/L in 1 h and 5 h.

are listed in the two columns on the right wide of the table 2. For BB 1-4, 88-90 mg/L were required for effective flocculation in either 1 h or 5 h. For PB fractions 1 and 3, only 60 mg/L was required for effective flocculation in 5 h. The consistency of results for the bovine and porcine blood samples surprisingly showed that the type of anticoagulant utilized has no effect upon the degree of flocculant activity subsequently observed.

Also listed in Table 2 are the results of tests of BB and PB plasma (red blood cells removed) and serum (supernatant obtained by centrifugation of coagulated blood). It can be seen that the plasma and serum were less effective than the whole blood, and more material was needed to satisfy the flocculation effectiveness criteria. BB plasmas 1,2 and 4 could not satisfy the criteria in one h. At 5 h, 120-150 mg/L of the BB plasmas and serum were required for effective flocculation. The PB plasmas were effective flocculants at 120 mg/L at 5 h.

Flocculant activity of fractionated blood: BB fraction 4 was applied to a preequilibrated BioSep-SEC-S3000 gel filtration column, and the blood components were eluted with 50 mM ammonium hydrogen carbonate (pH 8.2), as described above. Care was taken to limit the assayed sample size to facilitate finding those fractions with the very highest flocculant activity. A single peak of activity was observed in two adjacent vials. The molecular weights (MW) of the active fractions were estimated by comparison of their elution times to those in calibration curves constructed by passing samples of known MW over the column. Such an analysis showed the flocculation-active fraction in the MW range of 20-50 kDa. To refine the estimate, the analysis of BB fraction 4 was repeated collecting samples at 0.33 min intervals. Such an analysis gave an estimate for the MW of the flocculation-active fraction as 29-34 kDa.

The fraction with the highest flocculation activity was subjected to SDS PAGE analysis. A single high intensity band was noted after staining. The MW of the band was estimated to be 17.4 kDa, approximately one-half of the estimated MW from gel filtration chromatography. The intense band was excised from the gel, digested, and subjected to analysis by MALDI-TOF/TOF. Analysis confirmed that the band contained hemoglobin subunit α and hemoglobin subunit β (Table 3). The identity of key peptide fragments was confirmed by MS/MS analysis. Therefore it can be concluded that hemoglobin dimer is the flocculant-active fraction. That red color coeluted with the flocculation-active fractions supported the assignment of hemoglobin dimer as the active component. In addition, a sample of commercial bovine hemoglobin was directly tested for the flocculation activity (Table 2). At both 1 h and 5 h, only 30 mg/L of hemoglobin was required for effective flocculation.

Flocculant activity of fractionated plasma: BB plasma was prepared as described above. BB plasma fraction 4 was applied to a preequilibrated BioSep-SEC-S3000 gel filtration column, and the components were eluted with 50 mM ammonium hydrogen carbonate (pH 8.2). Fractions were collected in separate vials for 0.5 min. Portions of the samples in the vials were assayed for flocculant activity at pH 5.5 by adding an appropriate amount of acidic MES buffer to each fraction: Two peaks of flocculant activity were observed. The estimated MW ranges were 150-178 kDa and 31-52 kDa. A highly purified sample of BB gamma (γ)-globulin (MW 157 kDa) coeluted with the high MW flocculation activity. Since globulins constitute 56% (w/v) of plasma proteins (Moure, F., et al., Meat Science 64: 391-398, (2003)), it was considered likely that globulins play a role in flocculation. Accordingly, three commercial preparations of globulin were tested for flocculation activity: Cohen fraction III, Cohen fraction IV-4, and purified γ-globulin. Cohen fraction III contains γ+β BB globulins, and Cohen fraction IV-4 contains α+β BB globulins. Cohen fraction III and purified γ-globulin showed flocculant activity, but Cohen fraction IV-4 showed no flocculant activity (Table 2). Required concentrations of Cohen fraction III for effective flocculation were 60 mg/L at 1 and 5 h. For γ BB globulin 60 mg/L for at 1 h and 30 mg/L at 5 h were required for effective flocculation.

A commercial bovine serum albumin (BSA) standard (MW 66 kDa), eluted just before the low MW flocculant activity. Since BSA accounts for 42% of plasma protein, it was considered likely that BSA played a role in plasma flocculation. Additionally, PAGE analysis of the active fractions showed the presence of a strong band corresponding to the position of standard BSA. The putative BSA band was excised from the gel, and the hydrolyzed fragments were analyzed by MALDI-TOF/TOF. This gave a positive match for BSA (Table 3). However, when a commercial sample of BSA was analyzed for its ability to promote flocculation, no activity was observed (Table 2). Thus at present the flocculation-active, low MW protein in plasma is unidentified.

Plasma contains about fibrinogens (17-23%) (Duarte, R. T., et al., J. Agric. Food Chem. 47: 231-236 (1999); Ockerman, H. W., and C. L. Hansen, Chapter 9, Blood utilization, In: Animal By-Product Processing & Utilization, Technomic Publishing Company, Inc., Lancaster, pp. 325-354 (2000). A commercial sample of BB fibrinogen (MW 340 kDa) was tested for flocculation activity, and the results are shown in Table 2. For effective flocculation in 1 h, 150 mg/L of fibrinogen was needed. Effective flocculation in 5 h required 120 mg/L of fibrinogen. Thus surprisingly purified fibrinogen was a moderately good flocculating agent.

In summary, BB and PB surprisingly showed good flocculation activity. The activity did not depend upon the chemical nature of the anticoagulant used. BB plasma, BB serum and PB plasma also surprisingly showed good flocculation activity, although on a dry weight basis, higher amounts of the plasmas and serum were required for coagulation. Fractionation of whole BB by gel filtration and testing of standards surprisingly revealed that hemoglobin dimer and γ-globulin were surprisingly important contributors to the flocculation activity of blood. Hemoglobin was the largest contributor to blood flocculation activity. Fibrinogen had flocculation activity, but its activity was 2.5-4 times less than γ-globulin At least one other unidentified protein was involved in blood flocculation activity.

All of the references cited herein, including U.S. Patents, are incorporated by reference in their entirety.

Thus, in view of the above, the present invention concerns (in part) the following:

A method for aggregating suspended solid particles from an aqueous medium comprising (or consisting essentially of or consisting of) mixing the aqueous medium with an effective amount of a flocculant to aggregate the solid particles to form aggregated solid particles, and optionally separating the aggregated solid particles from the aqueous medium; wherein the flocculant is obtained from animal blood.

The above method wherein said animal blood is from agricultural livestock. The above method wherein said agricultural livestock is selected from the group consisting of poultry, pigs, or cattle. The above method wherein said poultry are chickens or turkeys.

The above method wherein said flocculant is selected from the group consisting of (1) whole animal blood, (2) animal blood free of coagulated material, (3) animal blood plasma, (4) animal blood free of coagulated material, heated to about 75° C.; centrifuged, and the supernatant utilized, (5) animal blood serum, (6) dehydrated forms of (1), (2), (3), (4) or (5), (7) purified or partially purified animal blood protein fractions, and (8) mixtures thereof. The above method wherein said flocculant is not whole animal blood. The above method wherein said flocculant is not animal blood free of coagulated material. The above method wherein said flocculant is not animal blood plasma. The above method wherein said flocculant is not animal blood free of coagulated material, heated to about 75° C., centrifuged, and the supernatant utilized. The above method wherein said flocculant is not animal blood serum. The above method wherein said flocculant is not purified or partially purified animal blood protein fractions. The above method wherein said flocculant is not dehydrated forms of whole animal blood. The above method wherein said flocculant is not dehydrated forms of animal blood free of coagulated material. The above method wherein said flocculant is not dehydrated forms of animal blood plasma. The above method wherein said flocculant is not dehydrated forms of animal blood free of coagulated material, heated to about 75° C., centrifuged, and the supernatant utilized. The above method wherein said flocculant is not dehydrated forms of animal blood serum. The above method wherein said dehydrated forms are prepared by drying (e.g., freeze drying or spray drying).

The above method wherein said flocculant is selected from the group consisting of hemoglobin dimer, y-globulin, fibrinogen or mixtures thereof. The above method wherein said flocculant is not hemoglobin dimer. The above method wherein said flocculant is not γ-globulin. The above method wherein said flocculant is not fibrinogen. The above method wherein said flocculant is a blood fraction having a molecular weight of about 10 to about 500 kDa (e.g., 1- to 500 kDa). The above method wherein said flocculant is not a blood fraction having a molecular weight of about 10 to about 500 kDa (e.g., 1- to 500 kDa). The above method wherein said flocculant is a blood fraction having a molecular weight of about 31 to about 340 kDa (e.g., 31 to 340 kDa. The above method wherein said flocculant is not a blood fraction having a molecular weight of about 31 to about 340 kDa (e.g., 31 to 340 kDa The above method wherein the effective amount of said flocculant is about 5 to about 500 mg/L. The above method wherein the effective amount of said flocculant is about 20 to about 100 mg/L.

The above method wherein the pH of said aqueous medium is adjusted to a pH of about 4 to about 5.7 by the addition of at least one acid. The above method wherein the pH of said aqueous medium is adjusted to a pH of about 4.8 to about 5.5 by the addition of at least one acid. The above method wherein said at least one acid is selected from the group consisting of sulfuric acid, phosphoric acid, citric acid, and mixtures thereof.

The above method wherein the temperature of said aqueous medium is adjusted to a temperature range of about 10° to about 50° C. The above method wherein the temperature of said aqueous medium is adjusted to a temperature range of about 20° to about 25° C.

The above method wherein said method comprises (or consists essentially of or consists of)) mixing said aqueous medium with an effective amount of a flocculant to aggregate said solid particles to form aggregated solid particles, and separating said aggregated solid particles from said aqueous medium.

The above method wherein said method comprises (or consists essentially of or consists of) mixing said aqueous medium with an effective amount of a flocculant to aggregate said solid particles to form aggregated solid particles, and separating said aggregated solid particles from said aqueous medium by gravity settling or centrifugation or filtration.

A method for separating suspended solid particles from an aqueous medium comprising (or consisting essentially of or consisting of) mixing the aqueous medium with an effective amount of a flocculant to aggregate the solid particles to form aggregated solid particles and subsequently separating the aggregated solid particles from the aqueous medium; wherein the flocculant is obtained from animal blood.

A method for separating suspended solid materials from an aqueous medium comprising (or consisting essentially of or consisting of) mixing the aqueous medium with an effective amount of a flocculant made from animal blood to cause the suspended particles to aggregate, making them easier to separate from the aqueous medium.

A method for separating suspended solid materials particles from an aqueous medium comprising (or consisting essentially of or consisting of) mixing the aqueous medium with an effective amount of a flocculant obtained from animal blood to obtain a flocculated material (aggregated particles) and, optionally separating the flocculated material from the aqueous medium.

A method to reduce soil erosion, comprising (or consisting essentially of or consisting of) applying (e.g., spraying) an effective amount of an erosion control agent obtained from animal blood onto (dry) soil.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

TABLE 1

Required concentration of flocculants to give suspended Polygloss ® kaolin at or below 1 g/L ± SE in 1 h and 5 h.

| CKB Fraction or Sample[b] | 1 h | | 5 h | |
|---|---|---|---|---|
| | +Ca[a] Concentration of Flocculant (mg/L) | | +Ca | |
| A | 84 | 28 | 84 | 28 |
| B | 84 | 84 | 84 | 27 |
| C | NS[c] | 79 | 79 | 26 |
| A-f | 170 | 55 | 85 | 55 |
| B-f | 85 | 55 | 55 | 25 |
| C-f | NS | 340 | 340 | 85 |
| A-s | 170 | 85 | 85 | 55 |
| B-s | 340 | 170 | 170 | 85 |
| C-s | NS | NS | NS | NS |
| PAM | NS | NS | NS | 29 |
| porcine gelatin | 75 | 75 | 75 | 75 |

[a]+Ca: binding assay contained 0.2 mM calcium chloride.

[b]Tests of each CKB fraction and gelatin were performed in 30 mM, pH 5.5 MES buffer.

[c]NS: No satisfaction of sedimentation criteria at any tested concentration

TABLE 2

Comparison of flocculant effectiveness.

| Blood Fraction or Sample[a] | 1 h Required Concentration of Flocculant (mg/L)[b] | 5 h Required Concentration of Flocculant (mg/L)[b] |
|---|---|---|
| BB 1 | 88 | 88 |
| BB 2 | 90 | 90 |
| BB 3 | 88 | 88 |
| BB 4 | 90 | 90 |
| BB plasma 1[c] | NS[d] | 150 |
| BB plasma 2 | NS | 150 |
| BB plasma 3 | 180 | 120 |
| BB plasma 4 | NS | 150 |
| BB serum[e] | 150 | 120 |
| PB 1 | 90 | 60 |
| PB 3 | 90 | 60 |
| PB plasma 1[f] | 120 | 120 |
| PB plasma 3 | 150 | 120 |
| Cohen fraction III (γ + β BB globulins) | 60 | 60 |
| Cohen fraction IV-4 (α + β BB globulins) | NS | NS |
| γ BB globulin | 60 | 30 |
| BSA[g] | NS | NS |
| Hemoglobin | 30 | 30 |
| Fibrinogen | 150 | 120 |
| PAM[h] | NS | 29 |

[a]Tests of BB fractions, PB fractions, and proteins were performed in 17.8 mM, pH 5.5 MES buffer.
[b]Required concentration of flocculants to give suspended Polygloss kaolin at or below 1 g/L in 1 h and 5 h.
[c]BB plasmas 1, 2, 3, and 4 were prepared from the corresponding blood fractions.
[d]NS: No satisfaction of sedimentation criteria at any tested concentration.
[e]BB serum was prepared by centrifuging coagulated BB.
[f]PB plasmas 1 and 3 were prepared from the corresponding blood fractions.
[g]BSA: bovine serum albumin
[h]PAM was tested in 0.2 mM calcium chloride (Piazza and Garcia, Meat & bone meal extract and gelatin as renewable flocculants, Bioresource Technology, 101: 781-787 (2010)).

TABLE 3

Gel bands protein identification using MALDI-TOF/TOF mass spectrometry and SwissProt as database limited to mammals for identification.

| Gel Band | Protein[a] (Bos taurus) | Accession Number | Protein Score[b] | Peptides Found[c] (Confirmed MS/MS) | MW[d] (Da) |
|---|---|---|---|---|---|
| A | BSA | P02769 | 224 | 26 (3) | 69,248 |
| B | BSA | P02769 | 350 | 24 (3) | 69,248 |
| C | Hemoglobin subunit α | P01966 | 283 | 5 (3) | 15,175 |
| C | Hemoglobin subunit β | P02070 | 233 | 11 (3) | 15,944 |

[a]Database search was limited to mammals and only the top hits corresponding to bovine proteins are reported.
[b]Score is based in the MASCOT search engine[1,2] Proteins score greater that 54 are significant (p < 0.05).
[c]Total number of peptide identified by MS and the number of peptides, in parenthesis, analyzed by MS/MS with resulting fragments matching database prediction for the assigned sequence.
[d]Reported MW is the corresponding to the sequence in the database and not to the actual protein.

We claim:

1. A method for aggregating suspended solid particles in an aqueous medium, said method comprising mixing said aqueous medium with an effective amount of a flocculant to aggregate said solid particles to form aggregated solid particles, and optionally separating said aggregated solid particles from said aqueous medium; wherein said flocculant is obtained from animal blood.

2. The method according to claim 1, wherein said animal blood is from agricultural livestock.

3. The method according to claim 2, wherein said agricultural livestock is selected from the group consisting of poultry, pigs, or cattle.

4. The method according to claim 3, wherein said poultry are chickens or turkeys.

5. The method according to claim 1, wherein said flocculant is selected from the group consisting of (1) whole animal blood, (2) animal blood free of coagulated material, (3) animal blood plasma, (4) animal blood free of coagulated material, heated to about 75° C., centrifuged, and the supernatant utilized, (5) animal blood serum, (6) dehydrated forms of (1), (2), (3), (4) or (5), (7) purified or partially purified animal blood protein fractions, and (8) mixtures thereof.

6. The method according to claim 5, wherein said dehydrated forms are prepared by freeze drying or spray drying.

7. The method according to claim 1, wherein the effective amount of said flocculant is about 5 to about 500 mg/L.

8. The method according to claim 1, wherein the effective amount of said flocculant is about 20 to about 100 mg/L.

9. The method according to claim 1, wherein the pH of said aqueous medium is adjusted to a pH of about 4 to about 5.9 by the addition of at least one acid.

10. The method according to claim 1, wherein the pH of said aqueous medium is adjusted to a pH of about 4.8 to about 5.5 by the addition of at least one acid.

11. The method according to claim 9, wherein said at least one acid is selected from the group consisting of sulfuric acid, phosphoric acid, citric acid, and mixtures thereof.

12. The method according to claim 1, wherein the temperature of said aqueous medium is adjusted to a temperature range of about 10° to about 50° C.

13. The method according to claim 1, wherein the temperature of said aqueous medium is adjusted to a temperature range of about 20° to about 25° C.

14. The method according to claim 1, wherein said method comprises mixing said aqueous medium with an effective amount of a flocculant to aggregate said solid particles to form aggregated solid particles, and separating said aggregated solid particles from said aqueous medium.

15. The method according to claim 1, wherein said method comprises mixing said aqueous medium with an effective amount of a flocculant to aggregate said solid particles to form aggregated solid particles, and separating said aggregated solid particles from said aqueous medium by gravity settling or centrifugation or filtration.

16. The method according to claim 1, wherein said flocculant is selected from the group consisting of hemoglobin dimer, γ-globulin, fibrinogen, and mixtures thereof.

17. The method according to claim 1, wherein said flocculant is a blood fraction having a molecular weight of about 10 to about 500 kDa.

18. The method according to claim 1, wherein said flocculant is a blood fraction having a molecular weight of about 31 to about 340 kDa.

* * * * *